(12) United States Patent
Do

(10) Patent No.: US 6,888,686 B2
(45) Date of Patent: May 3, 2005

(54) LENS FOR IMAGE PICKUP

(75) Inventor: Satoshi Do, 1-2-56 Miyado, Asaka-shi, Saitama, 351-0031 (JP)

(73) Assignees: Satoshi Do, Saitama (JP); Milestone Co., Ltd., Tokyo (JP)

( * ) Notice: Subject to any disclaimer, the term of this patent is extended or adjusted under 35 U.S.C. 154(b) by 3 days.

(21) Appl. No.: 10/686,765

(22) Filed: Oct. 17, 2003

(65) Prior Publication Data

US 2004/0141240 A1 Jul. 22, 2004

(30) Foreign Application Priority Data

Jan. 22, 2003 (JP) .................................. 2003-013169

(51) Int. Cl.$^7$ .......................... G02B 3/02; G02B 13/18; G02B 9/06; G11B 11/00
(52) U.S. Cl. ................... 359/717; 359/794; 369/112.24
(58) Field of Search ................................. 359/717, 718, 359/719, 794; 369/112.24

(56) References Cited

U.S. PATENT DOCUMENTS

| | | | |
|---|---|---|---|
| 3,006,248 A | 9/1961 | Linke et al. | |
| 5,000,552 A | 3/1991 | Simpson, Jr. et al. | |
| 5,689,376 A | 11/1997 | Lewis | |
| 6,449,105 B1 * | 9/2002 | Dou | 359/793 |
| 6,813,095 B2 * | 11/2004 | Chen | 359/717 |

FOREIGN PATENT DOCUMENTS

| | | |
|---|---|---|
| DE | 44 23 425 A | 1/1996 |
| DE | 297 22 657 U | 5/1998 |
| EP | 1 150 141 A | 10/2001 |
| EP | 1 302 802 A | 4/2003 |
| JP | 04-211215 | 8/1992 |
| JP | 05-281465 | 10/1993 |
| JP | 05-281468 | 10/1993 |
| JP | 06-059190 | 3/1994 |
| JP | 06-230278 | 8/1994 |
| JP | 07-181379 | 7/1995 |
| JP | 07-287164 | 10/1995 |
| JP | 08-338944 | 12/1996 |
| JP | 10-161020 | 6/1998 |
| JP | 10-206725 | 8/1998 |
| JP | 2000-035533 | 2/2000 |
| JP | 2000-066090 | 3/2000 |
| JP | 2000-089107 | 3/2000 |
| JP | 2000-227626 | 8/2000 |
| JP | 2000-321489 | 11/2000 |
| JP | 2000-347352 | 12/2000 |
| JP | 2001-013644 | 1/2001 |
| JP | 03-116109 | 5/2001 |
| JP | 2001-174701 | 6/2001 |
| JP | 2002-267928 | 9/2002 |

* cited by examiner

*Primary Examiner*—Scott J. Sugarman
(74) *Attorney, Agent, or Firm*—Venable; James R. Burdett

(57) ABSTRACT

A lens for image pickup is provided in which various aberrations are corrected satisfactorily, the optical length is at maximum approximately 6 mm, and moreover a sufficient back focus is secured. This lens for image pickup comprises a first lens, an aperture diaphragm, and a second lens, positioned in this order from the object side toward the image side. The first lens is a resin lens with a meniscus shape, with the convex surface facing the object side, and having positive refractive power. The second lens is a resin lens with a meniscus shape, with the convex surface facing the image side, and having positive refractive power.

6 Claims, 22 Drawing Sheets

LENS FOR IMAGE PICKUP

BACKGROUND OF THE INVENTION

1. Field of the Invention

This invention relates to a lens for image pickup, and in particular to a lens for image pickup suitable for application in image input devices for portable telephones and personal computers, digital cameras, CCD cameras for monitoring, inspection equipment, and other equipment employing a CCD or CMOS as an imaging device.

2. Description of Related Art

A lens for image pickup as described above must have a short optical length, defined as distance from the incidence plane on the object side of the lens for image pickup to the image pickup surface (the image-formation surface of the CCD or similar). Taking a portable telephone as an example, the optical length must be shorter than, at least, the thickness of the portable telephone set. On the other hand, it is preferable that the back focus, defined as the distance from the emission plane on the image side of the lens for image pickup to the image pickup surface, be as long as possible. This is because of the need to insert filters and other components between the imagine lens and the image pickup surface.

Apart from the above, a lens for image pickup is required to be corrected such that various aberrations are reduced by a sufficient amount that distortion of the image is not visually perceptible, and as required by the integration density of the imaging elements (also called "pixels"). Below, "various aberrations have been corrected so as to be sufficiently small that image distortions are not visually perceived, and requirements of the imaging element integration density are met" is, for simplicity, represented by the phrase "various aberrations are satisfactorily corrected" or similar. An image for which various aberrations are satisfactorily corrected may be called a "satisfactory image".

As a lens for image pickup satisfying the above requirements, lens systems with a small number of component lenses, with short optical length and designed for compactness, have been proposed. However, such lens systems employ lenses which are expensive due to the use of aspherical molded glass, or in which the curvature radius cannot, due to machining constraints, be made small in order to shorten the optical length. Lens systems are also seen in which a single lens is used, in order to achieve a short optical length, so that consequently aberrations cannot be completely eliminated.

One lens for image pickup which resolves the above-described problems has a back focus of appropriate length, a broad angle of field, and consists of two groups of two lens, with small distortion aberration (for example, see Japanese Patent Laid-open No. 2001-174701). There is also a lens for image pickup with a sufficiently long back focus, the refractive powers of the objective-side lens and image-side lens of which can be set appropriately, and with a two-group, two-lens configuration which is easily manufactured (for example, see Japanese Patent Laid-open No. 2000-321489). In addition, there is a lens for image pickup which is small, lightweight, with good telecentric properties, easily corrected astigmatic aberration, and machining and assembly of which is easy (see for example Japanese Patent Laid-open No. 2002-267928).

However, the optical length of a lens for image pickup to be mounted in a portable telephone set designed for compactness must be, at most, approximately 6 mm, and it is also required that satisfactory images be acquired. That is, as portable telephones become increasingly thin, it will become impossible to use a lens for image pickup if it does not have an optical length shorter than that of the lenses for image pickup disclosed in the above three patents, or is not capable of acquiring satisfactory images.

An object of this invention is to provide a lens for image pickup which, while having an F number of approximately 2.8, is configured from a small number of lenses, namely two, has a short lens optical length of 6 mm, and can acquire satisfactory images.

A further object is to provide a lens for image pickup which, by realizing all lenses (two lenses) configuring the lens for image pickup of this invention using plastic material, achieves reduced costs and lighter weight.

Here "a plastic material" is a polymer substance which can be caused to undergo plastic deformation, under heat, pressure, or both, and molded into a lens shape, and which is transparent to visible light.

SUMMARY OF THE INVENTION

In order to achieve the above objects, a lens for image pickup of this invention is configured with, in order from the object side and facing the image side, a first lens L1, an aperture diaphragm S1, and a second lens L2. The first lens L1 is a resin lens, meniscus-shaped with the convex surface facing the object side, and having positive refractive power. The second lens L2 is a resin lens, meniscus-shaped with the convex surface facing the image side, and having positive refractive power.

Further, in this lens for image pickup, both surfaces of the first lens L1 are aspherical, and moreover both surfaces of the second lens L2 are aspherical; the lens for image pickup is configured such that the optical length, which is the distance from the inclined plane on the object side (the object-side surface of the first lens L1) to the image pickup surface is at most 6 mm.

In a preferred configuration of this invention, the lens for image pickup satisfies the following conditions.

$$0.2 < |r5/f| < 3.1 \tag{1}$$

$$3.0 < (r5+r6)/(r5-r6) < 19.0 \tag{2}$$

$$1.0 < d/f < 1.5 \tag{3}$$

$$0.5 < r1/r2 < 2.0 \tag{4}$$

$$0.08 < D2/f < 0.1 \tag{5}$$

Here f is the focal length of the entire lens system; r5 is the curvature radius near the optical axis of the object-side surface of the second lens L2 (axial curvature radius); r6 is the curvature radius near the optical axis of the image-side surface of the second lens L2 (axial curvature radius); d is the distance (in air) from the object-side surface of the first lens L1 to the image plane; r1 is the curvature radius near the optical axis of the object-side surface of the first lens L1 (axial curvature radius); r2 is the curvature radius near the optical axis of the image-side surface of the first lens L1 (axial curvature radius); and D2 is the interval between the first lens L1 and the second lens L2.

Below, insofar as there is no cause for misunderstanding, r1, r2, r5 and r6 are used as variables signifying the values of the axial radii of curvature, and are also used as symbols identifying the lens surfaces (for example, the object-side surface of the first lens, and so on).

The above condition equation (1) stipulates the allocation of the overall lens focal length and refractive power between the first surface of the second lens L2 (the surface the axial curvature radius of which is r5) and the second surface (the surface the axial curvature radius of which is r6). If the first surface r5/f of the second lens L2 is larger than the lower limit of this condition equation (1), the focal length of the entire lens f is satisfactory for practical purposes. As a result, the second surface can be easily machined without increases in spherical aberration or coma aberration. That is, if the first surface r5/f of the second lens L2 is smaller than the lower limit of the condition equation (1), the focal length f of the entire lens is increased. Hence the radius of r6 for the second surface must be made small. By this means, a situation occurs in which machining of the second surface becomes difficult as spherical aberration and coma aberration increase.

If the first surface r5/f does not exceed the upper limit of the condition equation (1), then the curvature radius of the first surface r5 is reduced, and consequently the back focus is made longer, so that space for placing cover glass, an infrared cutoff filter and similar between the image pickup surface and the lens can be secured. That is, if the first surface r5/f exceeds the upper limit of the condition equation (1), then the curvature radius of the first surface r5 is increased, and as a result the back focus is shortened, so that a situation may occur in which cover glass, an infrared cutoff filter, and similar cannot be positioned between the image pickup surface and the lens.

Further, if the first surface r5/f does not exceed the upper limit of the condition equation (1), the angle of light rays incident on the maximum-radius portion (peripheral portion) in the image plane is moderate, and consequently through use of a microlens positioned at the CCD or CMOS device, rays can easily be incident on the light-receiving surface, and hence darkening of the peripheral portion of the image can be avoided. That is, if the first surface r5/f exceeds the upper limit of the condition equation (1), the angle at which rays are incident on the maximum-radius portion (peripheral portion) in the image plane is sharp, and so due to a microlens positioned at the CCD or CMOS device it is difficult for rays to be incident on the light-receiving surface, so that a situation may occur in which the peripheral portion of the image is darkened.

Condition equation (2) is a condition equation to obtain an adequately long back focus while maintaining a satisfactory image. That is, by changing the radii of curvature r5 and r6 of both the first and the second surfaces of the second lens, aberrations alone can be changed without changing the lens focal length, in an operation called "bending". When r5 and r6 are changed under the constraint that the lens focal length not be changed, the value of q given by q=(r5+r6)/(r5−r6) is called the lens shape factor, and is a parameter representing the extent of bending. That is, the parameter q is 0 for a symmetrical lens (r5=−r6), and becomes larger as the lens becomes more asymmetric; this parameter indicates the extent of deviation from a symmetrical lens (the extent of asymmetry).

Hence the above condition equation (2) signifies that the parameter q, indicating the extent of bending of the second lens, should be set in the range from 3.0 to 19.0.

In other words, if the curvature radius is such that r5 does not exceed the upper limit of the condition equation (2), a satisfactory image can be obtained without the spherical aberration and the meridional plane of astigmatic aberration becoming too positive. If the curvature radius is such that r6 does not exceed the lower limit, the incidence of rays on the CCD image pickup surface is moderate without baking the back focus too short, so that a situation in which darkening of the periphery due to total reflection by the microlens can be avoided. Also, machining becomes easier. In other words, if a curvature radius is used such that r5 exceeds the upper limit of condition equation (2), then a situation may occur in which spherical aberration and the meridional plane of astigmatic aberration are too negative, and a satisfactory image cannot be obtained. And if a curvature radius is employed such that r6 exceeds the lower limit, the back focus becomes short and consequently the angle of incidence of rays on the CCD image pickup surface is sharp, so that a situation may occur in which total reflection by the microlens causes darkening at the periphery.

The above condition equation (3) stipulates the size of the lens aperture; if the optical path length given by d (the distance in air from the object-side surface of the first lens L1 to the image pickup surface) is not smaller than the lower limit, then there is no problem arising from large thicknesses of the first lens L1 and second lens L2, so that resin does not pass through a die easily during molding and machining. Further, if the optical length d is a length not exceeding the upper limit, there is no need to increase the outer diameters of the first lens L1 and second lens L2, and if there is no reduction in the peripheral light volume ratio, the lens system can easily be made more compact.

That is, if the optical path length given by d is smaller than the lower limit, the thicknesses of the first lens L1 and second lens L2 are reduced, and during molding and machining no problems with the resin not passing through a die easily arise. Also, if the optical length d exceeds the upper limit, the peripheral light volume ratio is reduced. In order to secure a sufficient peripheral light volume, the outer diameters of the first lens L1 and second lens L2 must be made large. The outer diameter of the lens system must be made correspondingly larger, and consequently it becomes difficult to make the lens system more compact.

The above condition equation (4) stipulates the shape of the first lens L1, in terms of the ratio of the axial curvature radius on the object side to the axial curvature radius on the image side of the first lens L1. If r1 of the first lens L1 is increased and the lower limit of condition equation (4) is exceeded, spherical aberration is not negative and there is no increase in coma aberration, so that correction is easy. Also, aspherical surface machining is easy. If r2 of the first lens L1 is made small so that the lower limit of the condition equation (4) is exceeded, spherical aberration is positive and astigmatic aberration in the meridional plane is positive with a small absolute value, and coma aberration is also reduced, so that correction is easy. Also, if r1 of the first lens L1 is small and the upper limit is not exceeded, spherical aberration is small and astigmatic aberration in the meridional plane is also small, so that correction is easy. If r2 of the first lens L1 increases and the upper limit is not exceeded, spherical aberration and astigmatic aberration in both the meridional plane and the sagittal plane are small, and in addition distortion aberration is positive with a small absolute value, so that correction is easy.

In other words, if r1 of the first lens L1 is small and the lower limit of the condition equation (4) is not exceeded, spherical aberration becomes negative and coma aberration is increased, so that correction may become difficult. Also, aspherical surface machining becomes difficult. If r2 of the first lens L1 is large and the lower limit of the condition equation (4) is not exceeded, spherical aberration is negative and astigmatic aberration in the meridional plane is negative with a large absolute value, and coma aberration also increases, so a situation may arise in which correction is difficult. If r1 of the first lens L1 increases and the upper limit is exceeded, spherical aberration increases and astigmatic aberration in the meridional plane also increases, so a situation may occur in which correction is difficult. If r2 of the first lens L1 is decreased and the upper limit is exceeded, spherical aberration as well as astigmatic aberration in the meridional plane and sagittal plane all increase, and in addition distortion aberration is negative with a large absolute value, so a situation may arise in which correction is difficult.

The above condition equation (5) stipulates the range of the interval D2 between the first lens L1 and the second lens L2. The condition given by the above condition equation (5) is a condition for reducing the field curvature aberration. If the interval D2 between the first lens L1 and the second lens L2 is not below the lower limit, the image-side surface of the first lens L1 (the surface with curvature r2) and the object-side surface of the second lens L2 (the surface with curvature r5) are not too close to the aperture diaphragm. Hence there is no need to make the lens outer diameter too small, and molding is easy; in addition, space for insertion of the aperture diaphragm can be secured. And if the interval D2 does not exceed the upper limit, the lens diameters of the second surface r2 of the first lens L1 and of the first surface r5 of the second lens L2 are not too large, and the lens for image pickup can be made compact. Also, the field curvature aberration does not become too large, and satisfactory images can be obtained.

In other words, if the interval D2 between the first lens L1 and the second lens L2 is below the lower limit, the image-side surface of the first lens L1 (the surface with curvature r2) and the object-side surface of the second lens L2 (the surface with curvature r5) are too close to the aperture diaphragm. Consequently the lens outer diameter must be made small, and molding becomes difficult; in addition, a situation may occur in which space to insert the aperture diaphragm cannot be secured. If the interval D2 exceeds the upper limit, the lens diameters of the second surface r2 of the first lens L1 and of the first surface r5 of the second lens L2 become too large, and it becomes difficult to make the lens for image pickup compact. Also, the field curvature aberration becomes large, and a situation may occur in which it is difficult to obtain a satisfactory image.

By employing a lens configuration which satisfies the five conditions of the above-described condition equations (1) through (5), a lens for image pickup can be provided which is small in size, acquires satisfactory images, and is compact, with an optical path length of at most 6 mm.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Figure 1:
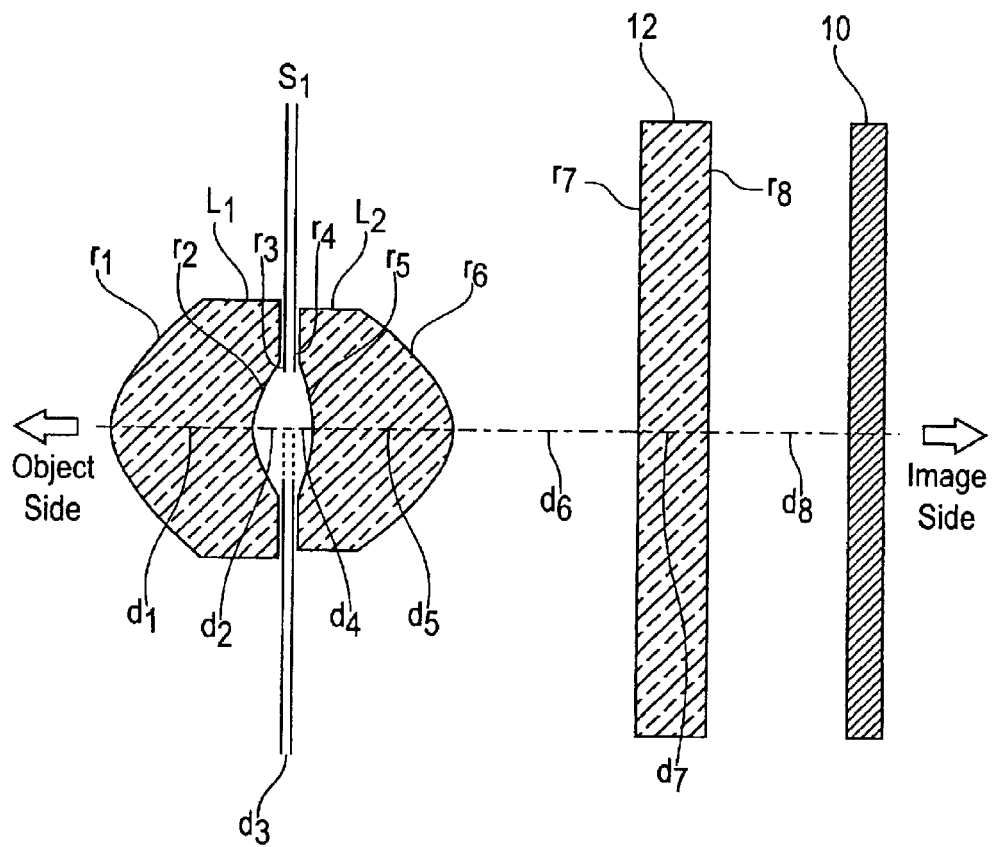
FIG. 1 is a cross-sectional view of a lens for image pickup of this invention.

Below, aspects of this invention are explained, referring to the drawings. These drawings merely illustrate in summary fashion the shapes, sizes, and positional relationships of constituent components to an extent facilitating understanding of this invention, and the numerical values and conditions described below are merely appropriate examples; the present invention is in no way limited to these aspects of the invention.

FIG. 1 is a drawing of the configuration of a lens for image pickup of this invention. The symbols for surfaces, intervals between surfaces and similar defined in FIG. 1 are common to FIG. 2, FIG. 6, FIG. 10, FIG. 14, FIG. 18, FIG. 22, and FIG. 26.

The first and second lenses, counting from the object side, are indicated by L1 and L2 respectively. The imaging device comprising the image pickup surface is denoted by 10, the cover glass separating the image pickup surface and the lens system is denoted by 12, and the aperture diaphragm is denoted by S1.

The parameters ri (i=1,2,3, . . . , 8) and di (i=1,2,3, . . . , 8) and similar appearing in this drawing are provided as specific numerical values in Table 1 through Table 7 below. The subscript i is assigned corresponding to the lens surface number or lens thickness, or to the interval between lenses, proceeding in order from the object side toward the image side.

That is, ri is the axial curvature radius of the ith surface; di is the interval from the ith surface to the i+1th surface; Ni is the refractive index of the medium of the lens comprising the ith surface and the i+1th surface; and, vi is the Abbe number of the medium of the lens comprising the ith surface and the i+1th surface.

The optical length d is the value obtained by adding d1 through d5, and further adding the back focus bf. The back focus bf is the distance along the optical axis from the image-side surface of the second lens L2 to the image pickup surface. However, the back focus bf is assumed to be calculated with the cover glass, inserted between the second lens L2 and the image pickup surface, removed. That is, in a state in which the cover glass is inserted, the geometrical distance from the image-side surface of the second lens L2 to the image pickup surface is larger than in the state in which there is no cover glass, since the refractive index of the cover glass is larger than 1. The extent to which the distance is greater depends on the refractive index and the thickness of the inserted cover glass. Hence in order to define the back focus bf as a value specific to the lens for image pickup, regardless of whether cover glass exists or not, a value which is measured with the cover glass removed is used. Further, the interval D2 between the first lens L1 and the second lens L2 is D2=d2+d3+d4.

Aspherical surface data is indicated together with surface numbers in the right-hand columns of each of Tables 1 through 7. The two surfaces r3 and r4 of the aperture diaphragm S1, and the two surfaces r7 and r8 of the cover glass, are planar, and so the curvature radius is indicated by $\infty$.

Aspherical surfaces used in this invention are described by the following equation.

$$Z = ch^2/[1+[1-(1+k)c^2h^2]^{1/2}]+A_0h^4+B_0h^6+C_0h^8+D_0h^{10}$$

Here Z is the depth from the tangent plane at the surface vertex; c is the curvature of the surface in the vicinity of the optical axis; h is the height from the optical axis; k is the conic constant; A0 is the fourth-order aspheric coefficient, B0 is the sixth-order aspheric coefficient, C0 is the eighth-order aspheric coefficient, and D0 is the tenth-order aspheric coefficient.

In each of Tables 1 through 7 of this Specification, in specifying the exponents of numerical values indicating aspheric coefficients, for example, "e-1" means "10 to the −1 power". Further, a value indicated as the focal length f is the combined focal length of the lens system comprising the first lens and the second lens.

Below, the radii of curvature (in millimeter units), intervals between lens surfaces (in millimeter units), lens material refractive indices, lens material Abbe numbers, focal lengths, numerical apertures, and aspheric surface coefficients for the component lenses of first through seventh embodiments are listed.

TABLE 1

First Embodiment

| Radius of Curvature ($r_i$) | Distance ($d_i$) | Refractivity ($N_i$) | Abbe Number ($v_i$) | Aspheric Coefficient | | | | |
|---|---|---|---|---|---|---|---|---|
| | | | | k | $A_o$ | $B_o$ | $C_o$ | $D_o$ |
| r1 = 1.1005 | d1 = 1.0000 | N1 = 1.53 | v1 = 56.0 | 0.2914e0 | −0.2893e−1 | 0.4143e−1 | −0.1157e−1 | −0.2254e−1 |
| r2 = 0.9969 | d2 = 0.1800 | | | 0.2038e+1 | −0.8885e−1 | 0.3046e0 | 0.3106e+1 | −0.8533e+1 |
| r3 = $\infty$ | d3 = 0.0500 | | | | | | | |
| r4 = $\infty$ | d4 = 0.1200 | | | | | | | |
| r5 = −1.5132 | d5 = 1.0000 | N5 = 1.53 | v5 = 56.0 | 0.4601e+1 | 0.6354e−1 | −0.9808e0 | 0.7594e0 | 0.1325e+1 |
| r6 = −0.9973 | d6 = 1.3415 | | | 0.1829e0 | −0.1055e−1 | 0.8696e−1 | −0.1550e0 | 0.8639e−1 |
| r7 = $\infty$ | d7 = 0.5000 | N7 = 1.52 | (Filter) | | | | | |
| r8 = $\infty$ | d8 = 1.0000 | | | | | | | |

Focal Length f = 3.718 mm
Numerical Aperture Fno = 2.80

TABLE 2

Second Embodiment

| Radius of Curvature ($r_i$) | Distance ($d_i$) | Refractivity ($N_i$) | Abbe Number ($v_i$) | Aspheric Coefficient | | | | |
|---|---|---|---|---|---|---|---|---|
| | | | | k | $A_o$ | $B_o$ | $C_o$ | $D_o$ |
| r1 = 1.0200 | d1 = 1.1000 | N1 = 1.53 | v1 = 56.0 | 0.6600e−1 | −0.9800e−2 | 0.1220e−1 | −0.3070e−1 | 0.1540e−1 |
| r2 = 1.2660 | d2 = 0.1500 | | | 0.3600e+1 | −0.1090e0 | 0.3790e0 | −0.9480e0 | −0.1860e+1 |
| r3 = $\infty$ | d3 = 0.0500 | | | | | | | |
| r4 = $\infty$ | d4 = 0.1500 | | | | | | | |
| r5 = −1.7600 | d5 = 0.9500 | N5 = 1.53 | v5 = 56.0 | 0.9200e+1 | −0.1100e0 | 0.4890e0 | −0.1520e+1 | −0.3900e−1 |

TABLE 2-continued

Second Embodiment

| Radius of Curvature ($r_i$) | Distance ($d_i$) | Refractivity ($N_i$) | Abbe Number ($v_i$) | Aspheric Coefficient | | | | |
|---|---|---|---|---|---|---|---|---|
| | | | | k | $A_0$ | $B_0$ | $C_0$ | $D_0$ |
| r6 = −1.4860 | d6 = 0.4961 | | | 0.1260e+1 | 0.3200e−1 | −0.2300e0 | 0.3200e0 | −0.1900e0 |
| r7 = ∞ | d7 = 0.5000 | N7 = 1.49 | (Filter) | | | | | |
| r8 = ∞ | d8 = 1.0000 | | | | | | | |

Focal Length f = 3.800 mm
Numerical Aperture Fno = 2.80

TABLE 3

Third Embodiment

| Radius of Curvature ($r_i$) | Distance ($d_i$) | Refractivity ($N_i$) | Abbe Number ($v_i$) | Aspheric Coefficient | | | | |
|---|---|---|---|---|---|---|---|---|
| | | | | k | $A_0$ | $B_0$ | $C_0$ | $D_0$ |
| r1 = 1.0546 | d1 = 1.1000 | N1 = 1.53 | v1 = 56.0 | 0.1538e0 | −0.3547e−2 | −0.1102e−1 | 0.1157e−1 | −0.1312e−1 |
| r2 = 1.1658 | d2 = 0.1500 | | | 0.3564e+1 | −0.1446e0 | 0.6199e0 | −0.1363e+1 | −0.2819e+1 |
| r3 = ∞ | d3 = 0.0500 | | | | | | | |
| r4 = ∞ | d4 = 0.1000 | | | | | | | |
| r5 = −1.9760 | d5 = 0.9500 | N5 = 1.53 | v5 = 56.0 | 0.1106e+2 | −0.1139e0 | 0.5364e0 | −0.2651e+1 | −0.2241e+1 |
| r6 = −1.1538 | d6 = 0.4597 | | | 0.5836e0 | 0.5789e−1 | −0.2171e0 | 0.3016e0 | −0.1784e0 |
| r7 = ∞ | d7 = 0.5000 | N7 = 1.49 | (Filter) | | | | | |
| r8 = ∞ | d8 = 1.0000 | | | | | | | |

Focal Length f = 3.302 mm
Numerical Aperture Fno = 2.80

TABLE 4

Fourth Embodiment

| Radius of Curvature ($r_i$) | Distance ($d_i$) | Refractivity ($N_i$) | Abbe Number ($v_i$) | Aspheric Coefficient | | | | |
|---|---|---|---|---|---|---|---|---|
| | | | | k | $A_0$ | $B_0$ | $C_0$ | $D_0$ |
| r1 = 0.9810 | d1 = 1.0200 | N1 = 1.53 | v1 = 56.0 | 0.1538e0 | −0.4410e−2 | −0.1584e−1 | 0.1923e−1 | −0.2521e−1 |
| r2 = 1.0840 | d2 = 0.1400 | | | 0.3564e+1 | −0.1797e0 | 0.8910e0 | −0.2265e+1 | −0.5418e+1 |
| r3 = ∞ | d3 = 0.0500 | | | | | | | |
| r4 = ∞ | d4 = 0.0890 | | | | | | | |
| r5 = −1.8380 | d5 = 0.8900 | N5 = 1.53 | v5 = 56.0 | 0.1106e+2 | −0.1416e0 | 0.7711e0 | −0.4406e+1 | −0.4307e+1 |
| r6 = −1.0730 | d6 = 0.8404 | | | 0.5836e0 | 0.7197e−1 | −0.3121e0 | 0.5013e0 | −0.3429e0 |
| r7 = ∞ | d7 = 0.5000 | N7 = 1.49 | (Filter) | | | | | |
| r8 = ∞ | d8 = 0.5000 | | | | | | | |

Focal Length f = 3.073 mm
Numerical Aperture Fno = 2.80

TABLE 5

Fifth Embodiment

| Radius of Curvature ($r_i$) | Distance ($d_i$) | Refractivity ($N_i$) | Abbe Number ($v_i$) | Aspheric Coefficient | | | | |
|---|---|---|---|---|---|---|---|---|
| | | | | k | $A_0$ | $B_0$ | $C_0$ | $D_0$ |
| r1 = 1.1547 | d1 = 1.0000 | N1 = 1.58 | v1 = 30.0 | 0.3245e0 | −0.1280e−1 | 0.2310e−1 | −0.1500e−1 | 0.2145e−2 |
| r2 = 1.0521 | d2 = 0.1800 | | | 0.2136e+1 | −0.5234e−1 | −0.7000e−1 | 0.2556e+1 | −0.8533e+1 |
| r3 = ∞ | d3 = 0.0500 | | | | | | | |
| r4 = ∞ | d4 = 0.1200 | | | | | | | |
| r5 = −1.4365 | d5 = 1.0000 | N5 = 1.53 | v5 = 56.0 | 0.5158e+1 | 0.1000e0 | −0.1156e+1 | 0.1548e+1 | 0.4300e+1 |
| r6 = −1.0050 | d6 = 1.3485 | | | 0.1935e0 | 0.2784e−1 | 0.2389e−1 | −0.1500e0 | 0.1463e0 |
| r7 = ∞ | d7 = 0.5000 | N7 = 1.52 | (Filter) | | | | | |
| r8 = ∞ | d8 = 1.0000 | | | | | | | |

Focal Length f = 3.797 mm
Numerical Aperture Fno = 2.80

TABLE 6

Sixth Embodiment

| Radius of Curvature ($r_i$) | Distance ($d_i$) | Refractivity ($N_i$) | Abbe Number ($v_i$) | Aspheric Coefficient | | | | |
|---|---|---|---|---|---|---|---|---|
| | | | | k | $A_0$ | $B_0$ | $C_0$ | $D_0$ |
| r1 = 1.0050 | d1 = 1.1000 | N1 = 1.53 | v1 = 56.0 | 0.7037e−1 | −0.1140e−1 | 0.1400e−1 | −0.3210e−1 | 0.1410e−1 |
| r2 = 1.2501 | d2 = 0.1500 | | | 0.3323e+1 | −0.1200e0 | 0.7480e0 | 0.6630e−1 | −0.3000e+1 |
| r3 = ∞ | d3 = 0.0500 | | | | | | | |
| r4 = ∞ | d4 = 0.1500 | | | | | | | |
| r5 = −1.7322 | d5 = 0.9500 | N5 = 1.58 | v5 = 30.0 | 0.7800e+1 | −0.7600e−1 | 0.4540e0 | −0.1600e+1 | 0.2660e+1 |
| r6 = −1.5507 | d6 = 0.5001 | | | 0.1230e+1 | 0.4940e−1 | −0.2000e0 | 0.2100e0 | −0.1000e0 |
| r7 = ∞ | d7 = 0.5000 | N7 = 1.49 | (Filter) | | | | | |
| r8 = ∞ | d8 = 1.0000 | | | | | | | |

Focal Length f = 3.799 mm
Numerical Aperture Fno = 2.80

TABLE 7

Seventh Embodiment

| Radius of Curvature ($r_i$) | Distance ($d_i$) | Refractivity ($N_i$) | Abbe Number ($v_i$) | Aspheric Coefficient | | | | |
|---|---|---|---|---|---|---|---|---|
| | | | | k | $A_0$ | $B_0$ | $C_0$ | $D_0$ |
| r1 = 1.0807 | d1 = 1.1000 | N1 = 1.58 | v1 = 30.0 | 0.1212e0 | −0.2155e−1 | 0.3330e−1 | −0.4470e−1 | 0.1366e−1 |
| r2 = 1.2496 | d2 = 0.1500 | | | 0.3100e+1 | −0.1115e0 | 0.7037e0 | −0.8670e0 | −0.1430e+1 |
| r3 = ∞ | d3 = 0.0500 | | | | | | | |
| r4 = ∞ | d4 = 0.1500 | | | | | | | |
| r5 = −1.9498 | d5 = 0.9500 | N5 = 1.58 | v5 = 30.0 | 0.7550e+1 | −0.7000e−1 | 0.2770e0 | −0.2100e+1 | 0.2000e+1 |
| r6 = −1.6027 | d6 = 0.5091 | | | 0.1300e+1 | 0.1970e−1 | −0.1600e0 | 0.2140e0 | −0.1250e0 |
| r7 = ∞ | d7 = 0.5000 | N7 = 1.49 | (Filter) | | | | | |
| r8 = ∞ | d8 = 1.0000 | | | | | | | |

Focal Length f = 3.792 mm
Numerical Aperture Fno = 2.80

Below, the first through seventh embodiments are explained, referring to FIG. 2 through FIG. 29.

FIG. 2, FIG. 6, FIG. 10, FIG. 14, FIG. 18, FIG. 22, and FIG. 26 show summary drawings of lens configurations. FIG. 3, FIG. 7, FIG. 11, FIG. 15, FIG. 19, FIG. 23, and FIG. 27 show distortion aberration curves; FIG. 4, FIG. 8, FIG. 12, FIG. 16, FIG. 20, FIG. 24, and FIG. 28 show astigmatic aberration curves; and FIG. 5, FIG. 9, FIG. 13, FIG. 17, FIG. 21, FIG. 25, and FIG. 29 show chromatic/spherical aberration curves.

Distortion aberration curves show the amount of aberration (the amount by which the tangent condition along the horizontal axis is not satisfied, indicated as a percentage) with respect to the distance from the optical axis (indicated as a percentage, where 100 is the maximum distance from the optical axis in the image plane along the vertical axis). Astigmatic aberration curves, similarly to distortion aberration curves, indicate the amount of aberration along the horizontal axis (millimeter units) with respect to the distance from the optical axis. In the case of astigmatic aberration, aberration amounts in the meridional plane and in the sagittal image plane (millimeter units) on the horizontal axis are shown. Chromatic/spherical aberration curves show aberration amounts along the horizontal axis (millimeter units) with respect to the distance of incidence h (F number). Chromatic/spherical aberration curves show aberration amounts for the C line (light with wavelength 656.3 nm), d line (light with wavelength 587.6 nm), e line (light with wavelength 546.1 nm), F line (light with wavelength 486.1 nm), and g line (light with wavelength 435.8 nm). The refractive index shown in the refractive index for the d line (light with wavelength 587.6 nm).

Below, features of each of these embodiments are described. The first through the fourth embodiments all used, in the first lens L1 and second lens L2 having a meniscus shape with convex surface facing the object side and with positive refractive power, ZEONEX E48R, a cycloolefin plastic (ZEONEX is a registered trademark, and E48R is a product number, of Nippon Zeon Co., Ltd.; subsequently this plastic is referred to simply as "ZEONEX"). In the fifth embodiment, polycarbonate was used in the first lens L1, and ZEONEX was used in the second lens L2. In the sixth embodiment, ZEONEX was used in the first lens L1, and polycarbonate was used in the second lens L2. In the seventh embodiment, polycarbonate was used in both the first lens L1 and the second lens L2.

Both surfaces of the first lens L1, as well as both surfaces of the second lens L2, were formed to be aspherical. That is, the number of aspherical surfaces was four in each of the embodiments.

The Abbe number of the ZEONEX E48R which was the material of the first lens L1 and second lens L2 was 56 (the refractive index for the d line was 1.53), and the Abbe number of polycarbonate was 30 (the refractive index for the d line was 1.58). From simulation results, it was found that if the Abbe number of these lens materials was in the range from 30 to 60, there was no effective difference in aberration or other aspects of lens performance. That is, if the Abbe number was in the numerical range stated above, the various aberrations of a lens for image pickup which is an object of this invention could be corrected satisfactorily, compared with the various aberrations of a conventional lens for image pickup; moreover, a lens for image pickup with an optical length of at most 6 mm could be realized.

In each of the first through the seventh embodiments, a filter of thickness 0.5 mm is inserted between the lens system and the image pickup surface. In the first embodiment and the fifth embodiment, the material of this filter was acrylic (with a refractive index of 1.52 for the d line). In the second, third, fourth, sixth, and seventh embodiments, the material of this filter was glass (with a refractive index of 1.49 for the d line). The various aberrations described below were calculated assuming the existence of this filter.

First Embodiment (A) The focal length f of the entire lens is f=3.718 mm.
(B) The object-side curvature radius r5 of the second lens L2 is r5=−1.5132 mm.
(C) The image-side curvature radius r6 of the second lens L2 is r6=−0.9973 mm.
(D) The back focus bf is bf=2.671 mm.
(E) The distance in air from the object-side surface of the first lens L1 to the image plane, that is, the optical length d, is d=5.021 mm.
(F) The object-side curvature radius r1 of the first lens L1 is r1=1.1005 mm.
(G) The image-side curvature radius r2 of the first lens L1 is r2=0.9969 mm.
(H) The interval D2 between the first lens L1 and the second lens L2 is D2=0.35 mm.
(I) The focal length f1 of the first lens L1 is f1=8.68 mm.
(J) The focal length f2 of the second lens L2 is f2=3.34 mm.

Hence the following obtain:
(1) |r5/f|=|−1.5132/3.718|=0.407,
(2) (r5 +r6)/(r5−r6)=(1.5132+0.9973)/(1.5132−0.9973)= 4.866,
(3) d/f=5.021/3.718=1.350,
(4) r1/r2=1.1005/0.9969=1.104, and
(5) D2/f=0.35/3.718=0.0941.

Hence the lens system of the first embodiment satisfies all of the following condition equations (1) through (5).

| | |
|---|---|
| 0.2<|r5/f|<3.1 | (1) |
| 3.0<(r5+r6)/(r5−r6)<19.0 | (2) |
| 1.0<d/f<1.5 | (3) |
| 0.5<r1/r2<2.0 | (4) |
| 0.08<D2/f<0.1 | (5) |

Below, "condition equations" refers to the above five equations (1) through (5).

The aperture diaphragm S1 is provided at a position 0.18 mm (d2=0.18 mm) anterior from the second surface (the image-side surface) of the first lens L1, as indicated in Table 1. The numerical aperture (F number) is 2.8, and the combined focal length f is 3.718 mm.

Figure 2:
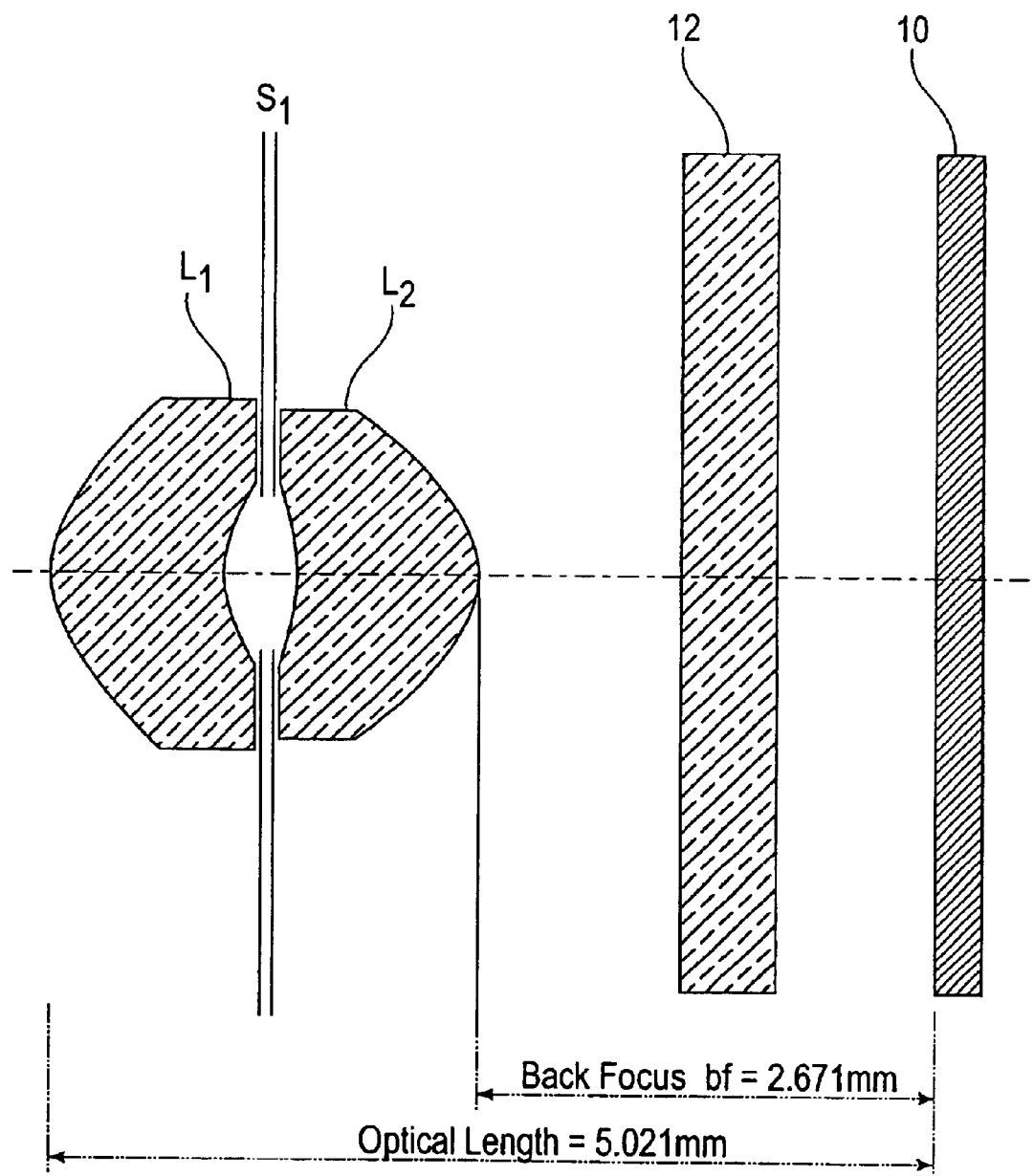
FIG. 2 is a cross-sectional view of a lens for image pickup of a first embodiment.

FIG. 2 shows a cross-sectional view of the lens for image pickup of the first embodiment. The optical length of this lens for image pickup is 5.021 mm, a value which is within the 6 mm limit. The back focus, at 2.671 mm, is also sufficiently long.

Figure 3:
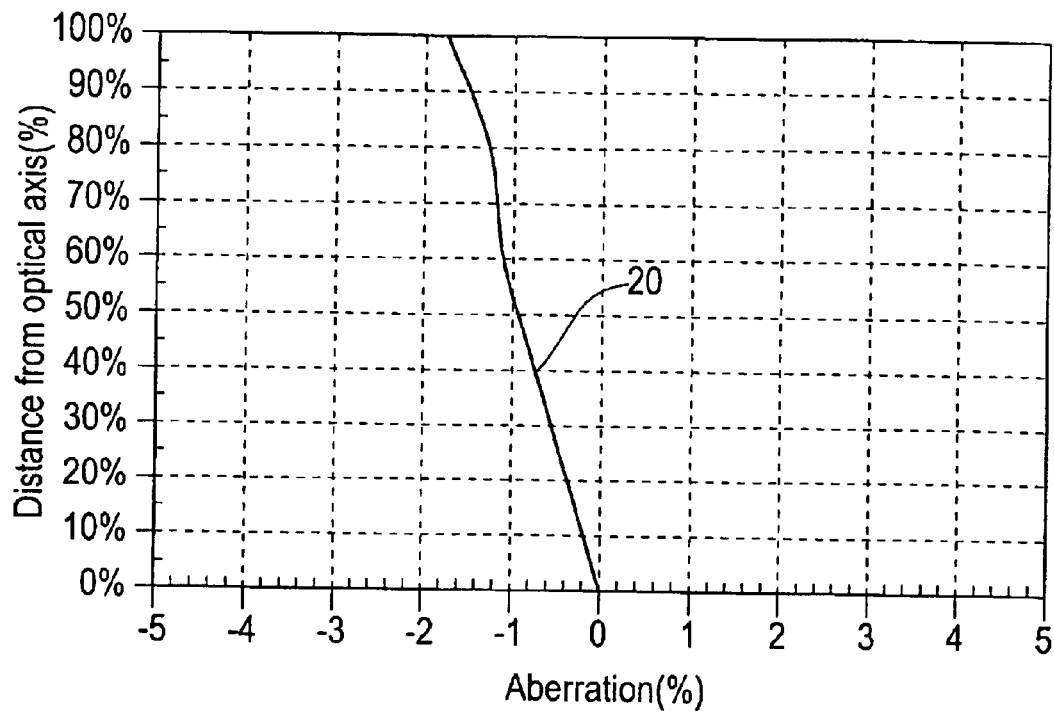
FIG. 3 is a graph of the distortion aberration of the lens for image pickup of the first embodiment.
Figure 4:
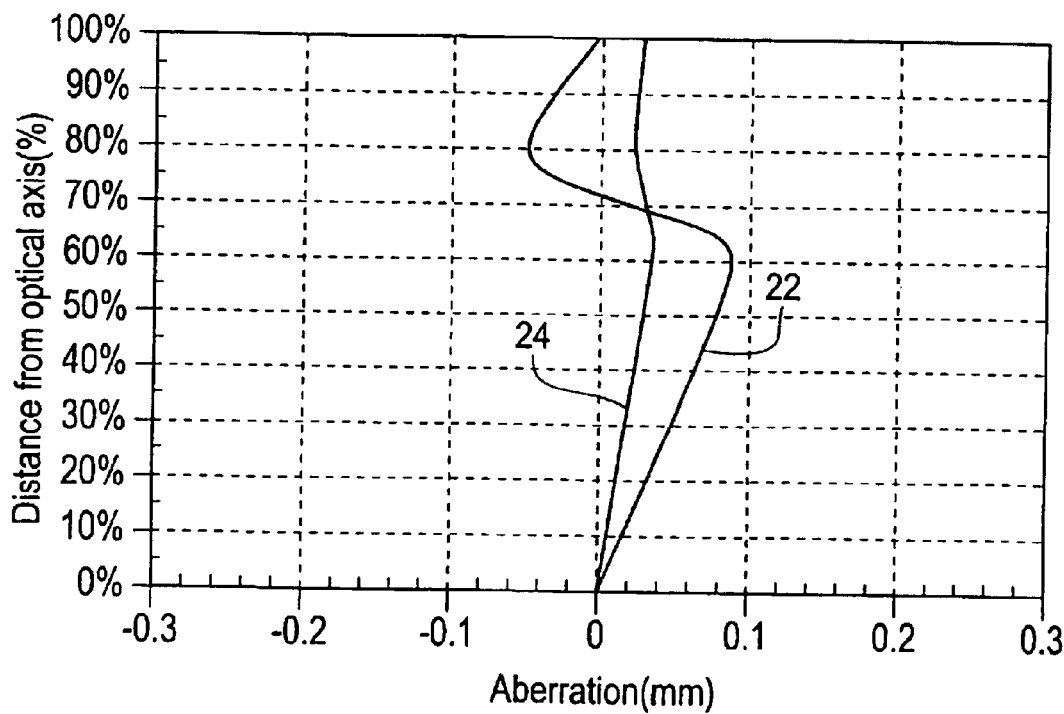
FIG. 4 is a graph of the astigmatic aberration of the lens for image pickup of the first embodiment.
Figure 5:
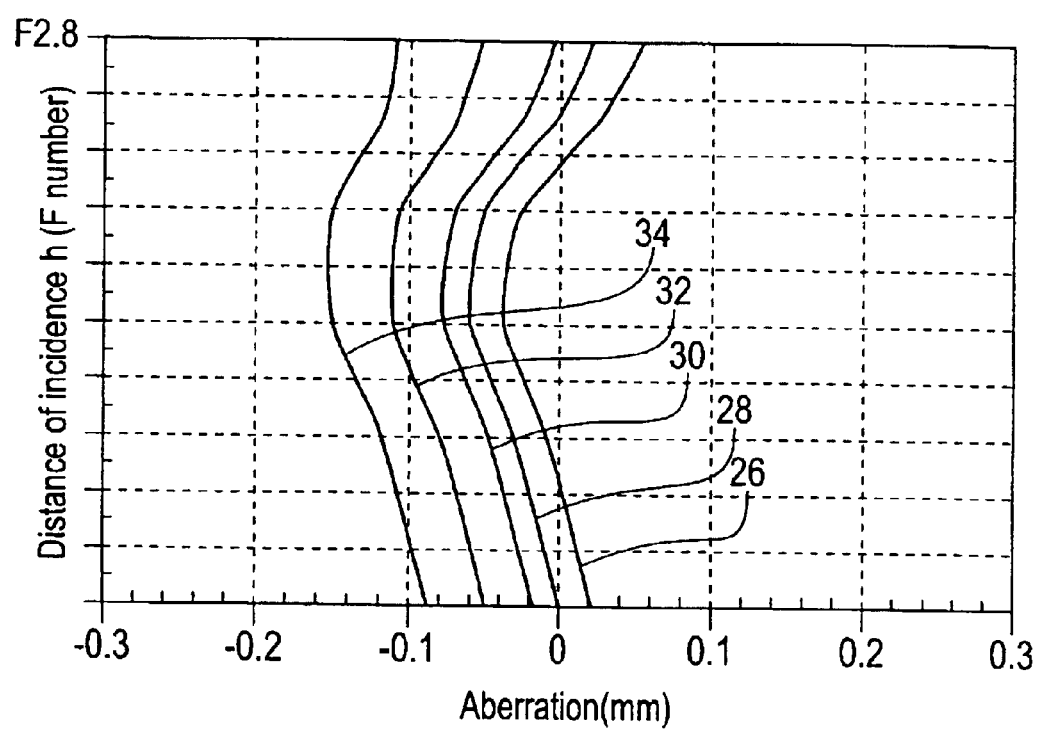
FIG. 5 is a graph of the chromatic/spherical aberration of the lens for image pickup of the first embodiment.

The distortion aberration curve 20 shown in FIG. 3, the astigmatic aberration curves (aberration curve 22 for the meridional plane and aberration curve 24 for the sagittal plane) shown in FIG. 4, and the chromatic/spherical aberration curves (aberration curve 26 for the C line, aberration curve 28 for the d line, aberration curve 30 for the e line, aberration curve 32 for the F line, and aberration curve 34 for the g line) shown in FIG. 5, are each shown in graphs.

The vertical axes for the aberration curves in FIG. 3 and FIG. 4 indicate the image height as a percentage of the distance from the optical axis. In FIG. 3 and FIG. 4, 100%, 85%, 80%, 70%, 50%, and 30% correspond respectively to 2.24 mm, 1.90 mm, 1.79 mm, 1.56 mm, 1.12 mm, and 0.67 mm. In the first embodiment, the image height 2.24 mm, when converted into the angle made with the optical axis by the chief ray prior to incidence on the lens system, is equivalent to 31.5°. The vertical axis of the aberration curves of FIG. 5 indicates the distance of incidence h (F number), the maximum of which corresponds to F2.8. In FIG. 5, the horizontal axis indicates the magnitude of the aberration.

The absolute value of the amount of distortion aberration is maximum, at 1.76%, at the position of 100% image height (image height 2.24 mm); at image heights equal to or below 2.24 mm, the absolute value of the aberration amount is within 1.76%.

The absolute value of the astigmatic aberration in the meridional plane is maximum, at 0.0876 mm, at the position of 60% image height (image height 1.34 mm), and the absolute value of the aberration is within 0.0876 mm at image heights of 2.24 mm and less.

The absolute value of chromatic/spherical aberration is maximum, at 0.15 mm, for the g line at a distance of incidence h of 50%, and the absolute value of the aberration is within 0.15 mm.

Second Embodiment (A) The focal length f of the entire lens is f=3.800 mm.
(B) The object-side curvature radius r5 of the second lens L2 is r5=−1.760 mm.
(C) The image-side curvature radius r6 of the second lens L2 is r6=−1.486 mm.
(D) The back focus bf is bf=1.831 mm.
(E) The distance in air from the object-side surface of the first lens L1 to the image plane, that is, the optical length d, is d=4.231 mm.
(F) The object-side curvature radius r1 of the first lens L1 is r1=1.020 mm.
(G) The image-side curvature radius r2 of the first lens L1 is r2=1.266 mm.
(H) The interval D2 between the first lens L1 and the second lens L2 is D2=0.35 mm.
(I) The focal length f1 of the first lens L1 is f1=3.94 mm.
(J) The focal length f2 of the second lens L2 is f2=8.29 mm.

Hence the following obtain:
(1) |r5/f|=|−1.760/3.800|=0.463,
(2) (r5+r6)/(r5−r6)=(1.760+1.486)/(1.760−1.486)=11.85,
(3) d/f=4.231/3.800=1.1134,
(4) r1/r2=1.020/1.266=0.806, and
(5) D2/f=0.35/3.800=0.0921.

Hence the lens system of the second embodiment satisfies all of the following condition equations (1) through (5).

| | |
|---|---|
| 0.2<|r5/f|<3.1 | (1) |
| 3.0<(r5+r6)/(r5−r6)<19.0 | (2) |
| 1.0<d/f<1.5 | (3) |
| 0.5<r1/r2<2.0 | (4) |
| 0.08<D2/f<0.1 | (5) |

The aperture diaphragm S1 is provided at a position 0.15 mm (d2=0.15 mm) anterior from the second surface (the image-side surface) of the first lens L1, as indicated in Table 2. The numerical aperture (F number) is 2.8, and the combined focal length f is 3.800 mm.

Figure 6:
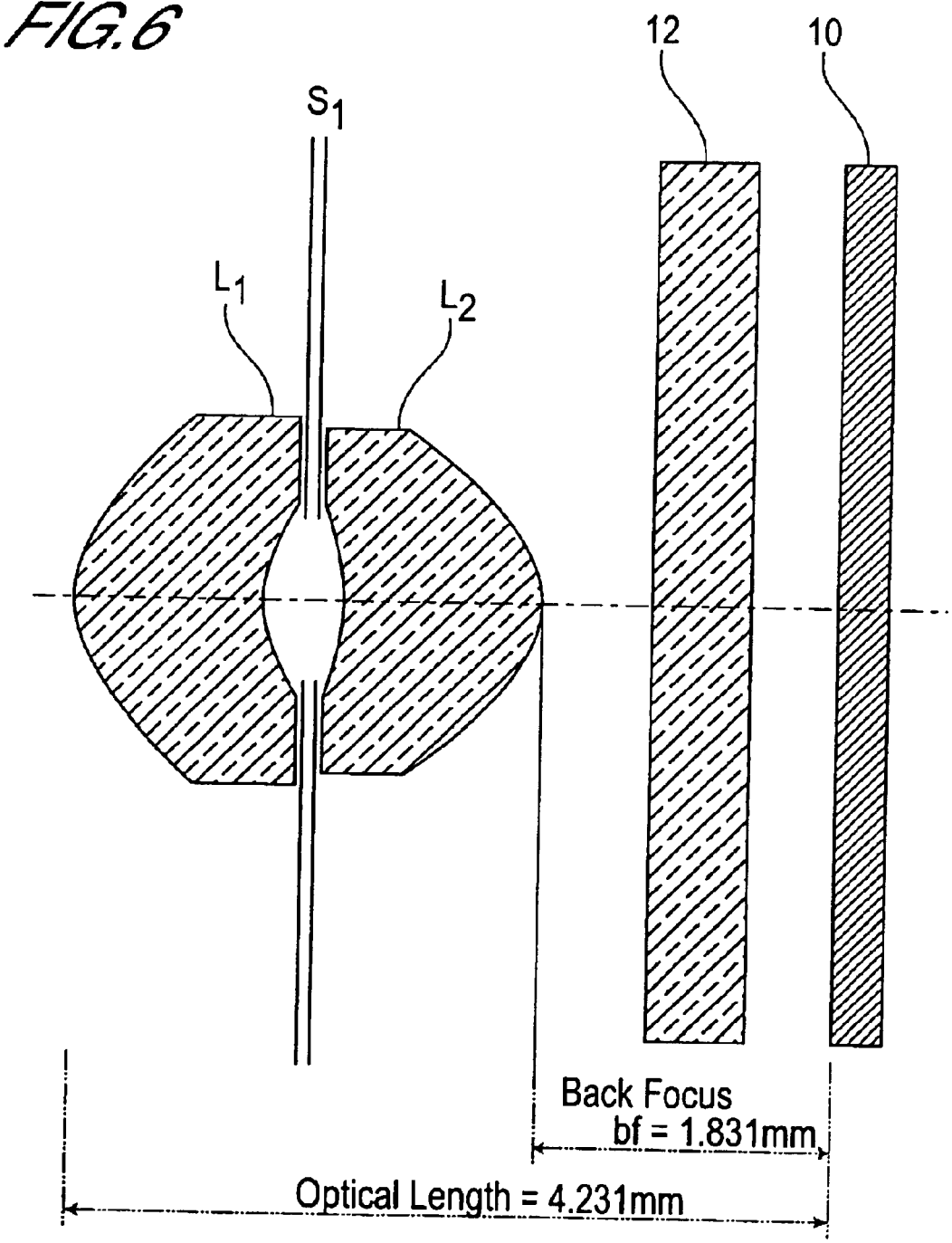
FIG. 6 is a cross-sectional view of a lens for image pickup of a second embodiment.

FIG. 6 shows a cross-sectional view of the lens for image pickup of the second embodiment. The optical length of this lens for image pickup is 4.231 mm, a value which is within the 6 mm limit. The back focus, at 1.831 mm, is also sufficiently long.

Figure 7:
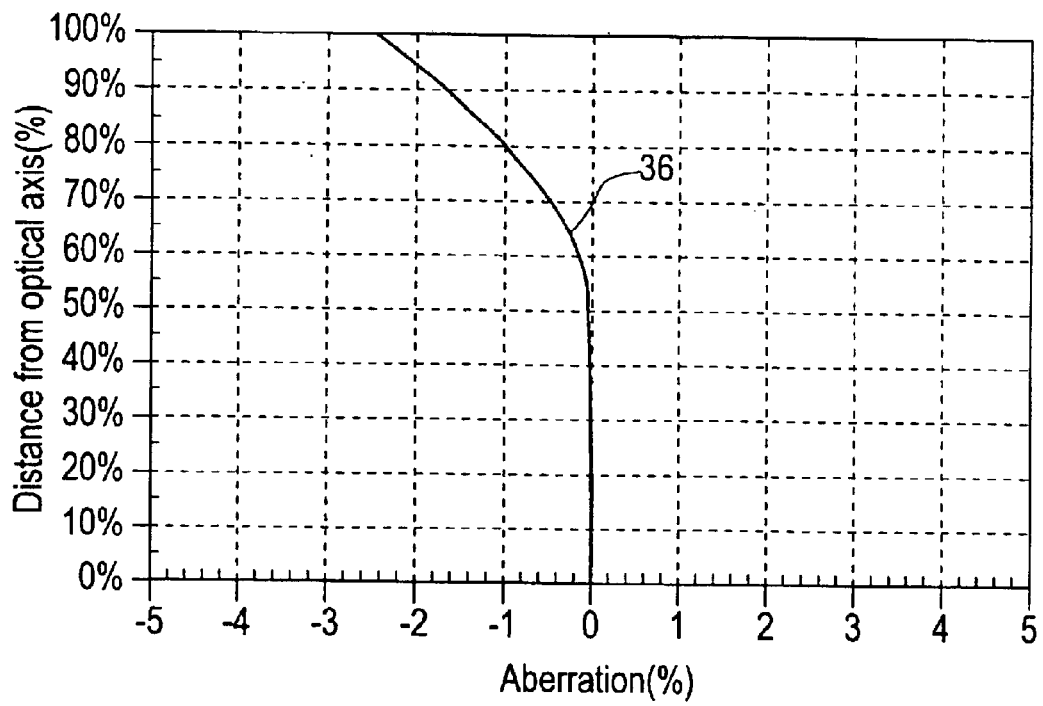
FIG. 7 is a graph of the distortion aberration of the lens for image pickup of the second embodiment.
Figure 8:
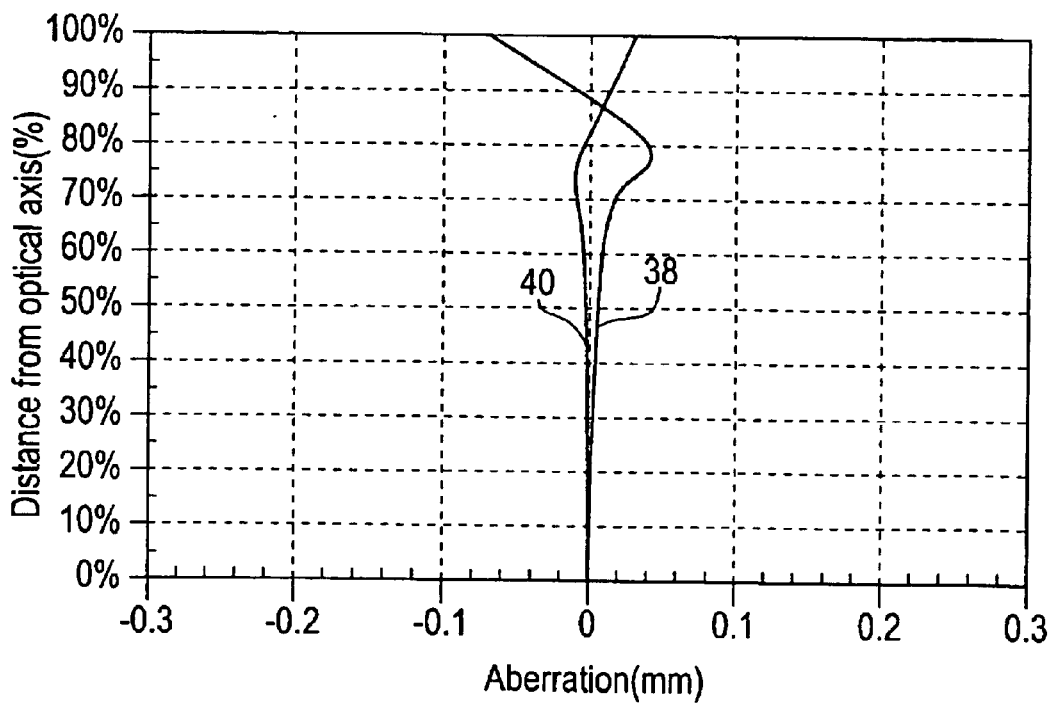
FIG. 8 is a graph of the astigmatic aberration of the lens for image pickup of the second embodiment.
Figure 9:
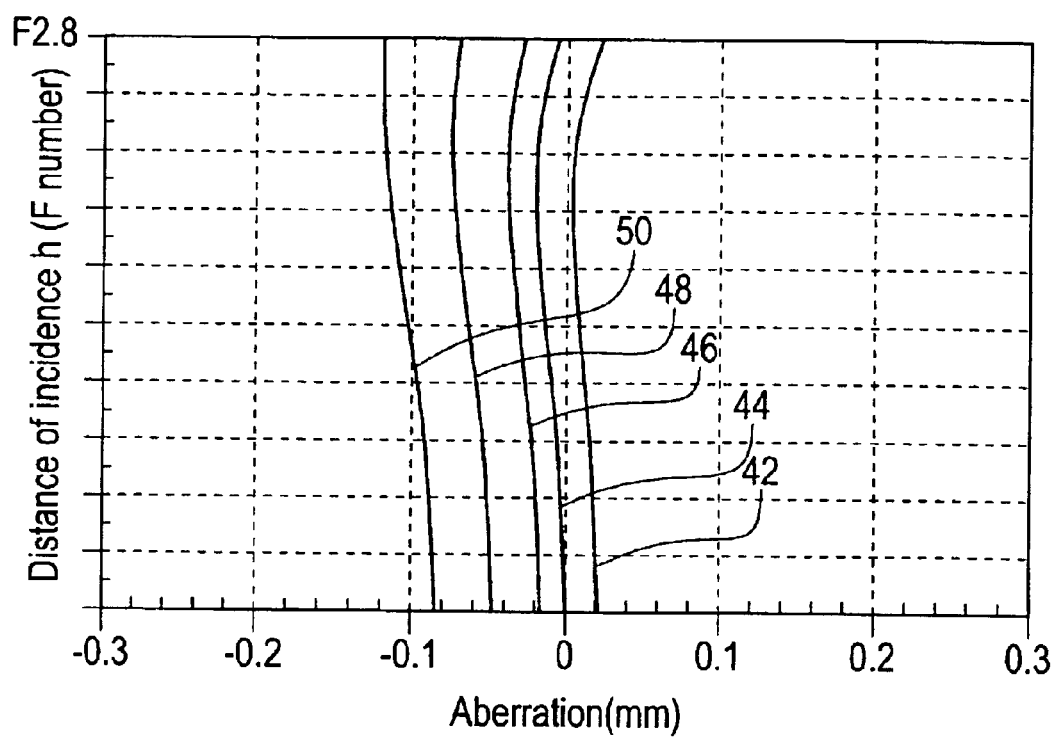
FIG. 9 is a graph of the chromatic/spherical aberration of the lens for image pickup of the second embodiment.

The distortion aberration curve 36 shown in FIG. 7, the astigmatic aberration curves (aberration curve 38 for the meridional plane and aberration curve 40 for the sagittal plane) shown in FIG. 8, and the chromatic/spherical aberration curves (aberration curve 42 for the C line, aberration curve 44 for the d line, aberration curve 46 for the e line, aberration curve 48 for the F line, and aberration curve 50 for the g line) shown in FIG. 9, are each shown in graphs. The vertical axes for the aberration curves in FIG. 7 and FIG. 8 indicate the image height as a percentage of the distance from the optical axis; 100%, 85%, 80%, 70%, 50%, and 30% correspond respectively to 2.24 mm, 1.91 mm, 1.80 mm, 1.58 mm, 1.13 mm, and 0.68 mm. In the second embodiment, the image height 2.24 mm, when converted into the angle made with the optical axis by the chief ray prior to incidence on the lens system, is equivalent to 31.0°. The vertical axis of the aberration curves of FIG. 9 indicates the distance of incidence h (F number), the maximum of which corresponds to F2.8. In FIG. 9, the horizontal axis indicates the magnitude of the aberration.

The absolute value of the amount of distortion aberration is maximum, at 2.46%, at the position of 100% image height (image height 2.24 mm); at image heights equal to or below 2.24 mm, the absolute value of the aberration amount is within 2.46%.

The absolute value of the astigmatic aberration in the meridional plane is maximum, at 0.0696 mm, at the position of 100% image height (image height 2.24 mm), and the absolute value of the aberration is within 0.0696 mm at image heights of 2.24 mm and less.

The absolute value of chromatic/spherical aberration is maximum, at 0.12 mm, for the g line at a distance of incidence h of 100%, and the absolute value of the aberration is within 0.12 mm.

Third Embodiment (A) The focal length f of the entire lens is f=3.302 mm.

(B) The object-side curvature radius r5 of the second lens L2 is r5=−1.976 mm.

(C) The image-side curvature radius r6 of the second lens L2 is r6=−1.154 mm.

(D) The back focus bf is bf=1.795 mm.

(E) The distance in air from the object-side surface of the first lens L1 to the image plane, that is, the optical length d, is d=4.145 mm.

(F) The object-side curvature radius r1 of the first lens L1 is r1=1.0546 mm.

(G) The image-side curvature radius r2 of the first lens L1 is r2=1.1658 mm.

(H) The interval D2 between the first lens L1 and the second lens L2 is D2=0.30 mm.

(I) The focal length f1 of the first lens L1 is f1=4.78 mm.

(J) The focal length f2 of the second lens L2 is f2=3.78 mm.

Hence the following obtain:

(1) $|r5/f|=|-1.976/3.3021|=0.598$, (2) $(r5+r6)/(r5-r6)=(1.976+1.154)/(1.976-1.154)=3.808$, (3) $d/f=4.145/3.302=1.2553$, (4) $r1/r2=1.0546/1.1658=0.905$, and (5) $D2/f=0.3/3.302=0.0909$.

Hence the lens system of the third embodiment satisfies all of the following condition equations (1) through (5).

$$0.2<|r5/f|<3.1 \quad (1)$$

$$3.0<(r5+r6)/(r5-r6)<19.0 \quad (2)$$

$$1.0<d/f<1.5 \quad (3)$$

$$0.5<r1/r2<2.0 \quad (4)$$

$$0.08<D2/f<0.1 \quad (5)$$

The aperture diaphragm S1 is provided at a position 0.15 mm (d2=0.15 mm) anterior from the second surface (the image-side surface) of the first lens L1, as indicated in Table 3. The numerical aperture (F number) is 2.8, and the combined focal length f is 3.302 mm.

Figure 10:
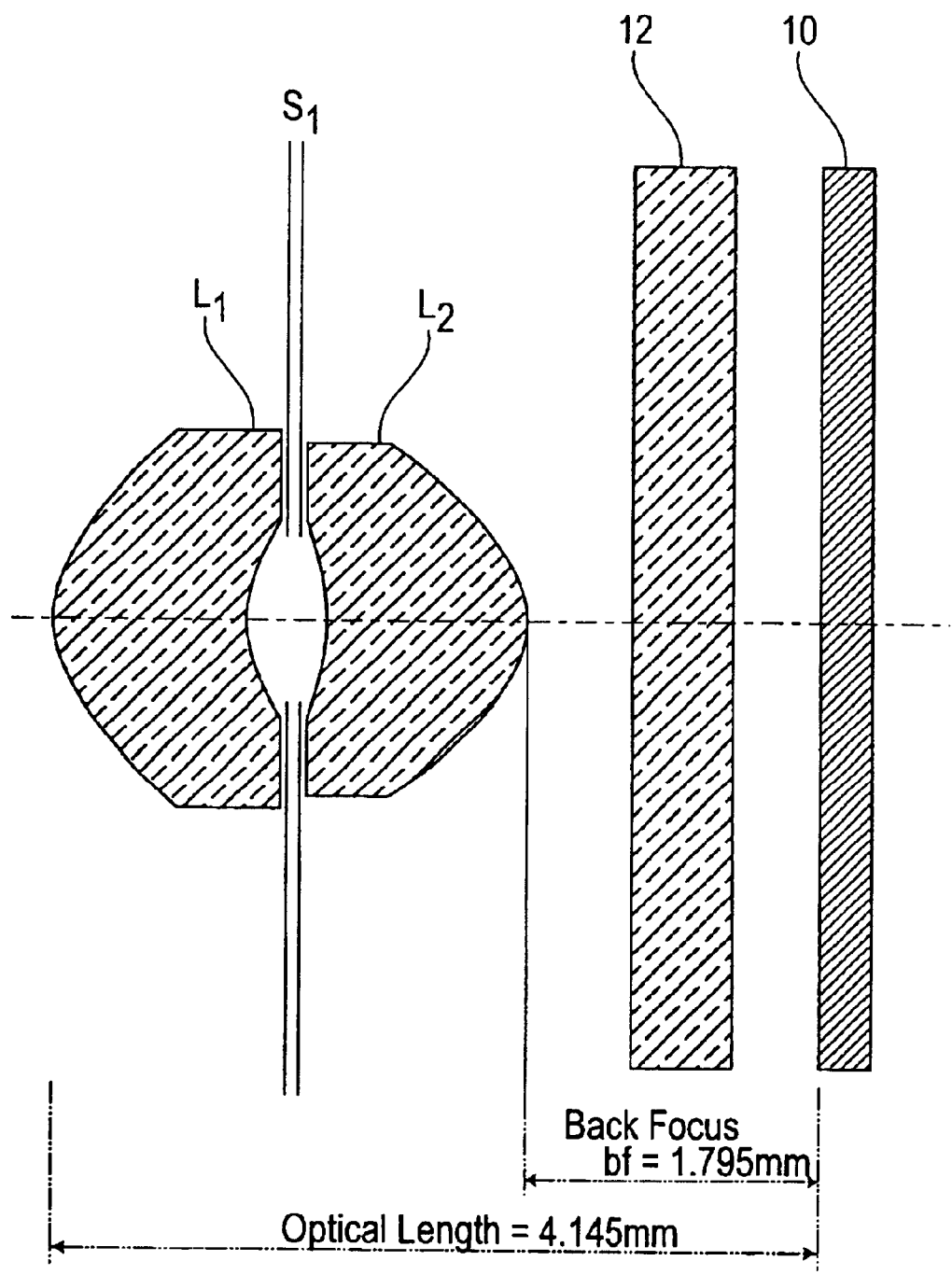
FIG. 10 is a cross-sectional view of a lens for image pickup of a third embodiment.

FIG. 10 shows a cross-sectional view of the lens for image pickup of the third embodiment. The optical length of this lens for image pickup is 4.145 mm, a value which is within the 6 mm limit. The back focus, at 1.795 mm, is also sufficiently long.

Figure 11:
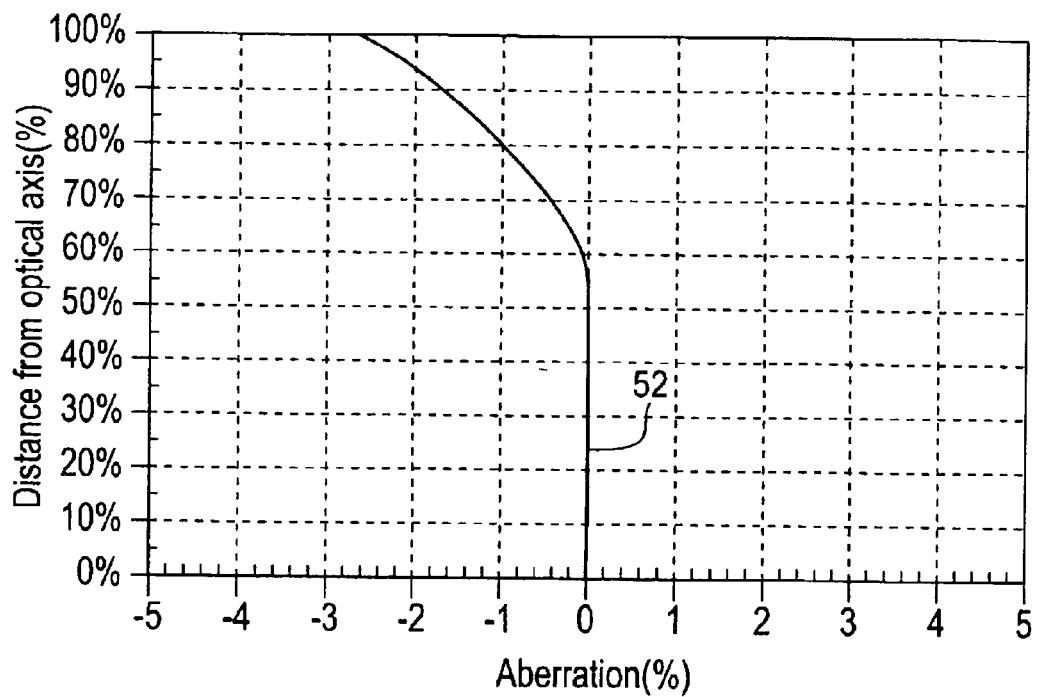
FIG. 11 is a graph of the distortion aberration of the lens for image pickup of the third embodiment.
Figure 12:
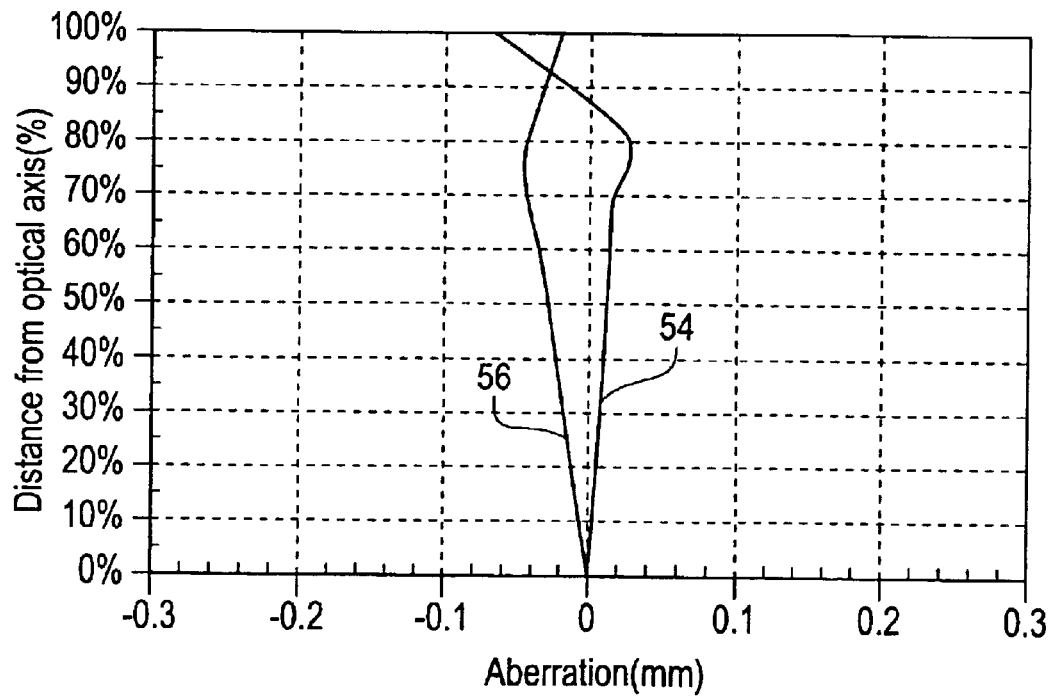
FIG. 12 is a graph of the astigmatic aberration of the lens for image pickup of the third embodiment.
Figure 13:
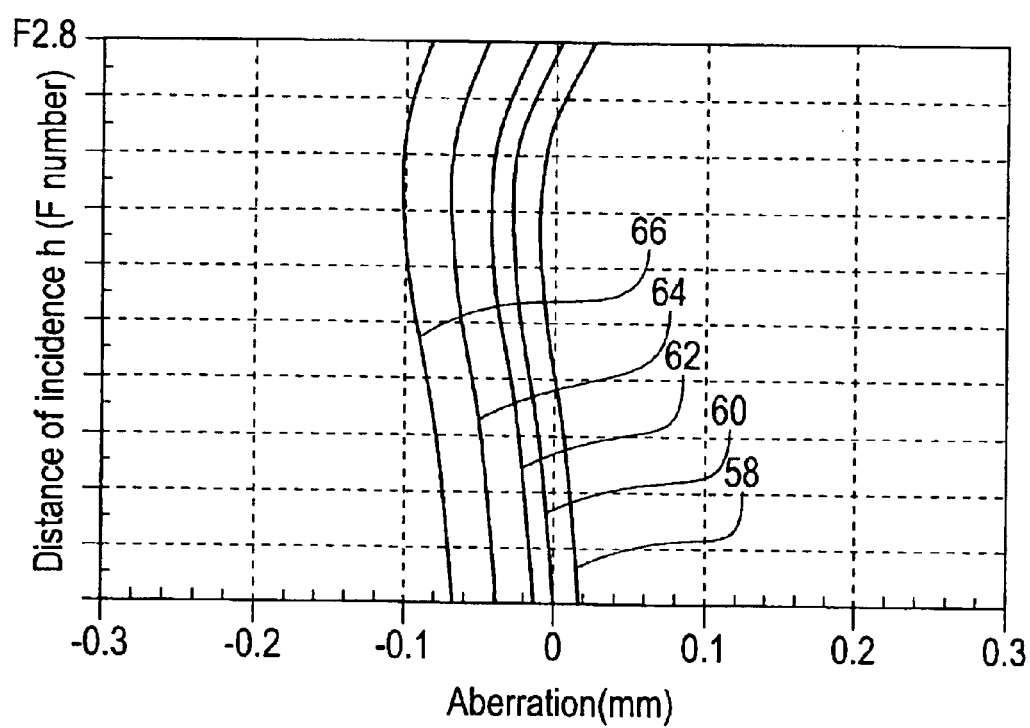
FIG. 13 is a graph of the chromatic/spherical aberration of the lens for image pickup of the third embodiment.

The distortion aberration curve 52 shown in FIG. 11, the astigmatic aberration curves (aberration curve 54 for the meridional plane and aberration curve 56 for the sagittal plane) shown in FIG. 12, and the chromatic/spherical aberration curves (aberration curve 58 for the C line, aberration curve 60 for the d line, aberration curve 62 for the e line, aberration curve 64 for the F line, and aberration curve 66 for the g line) shown in FIG. 13, are each shown in graphs. The vertical axes for the aberration curves in FIG. 11 and FIG. 12 indicate the image height as a percentage of the distance from the optical axis; 100%, 85%, 80%, 70%, 50%, and 30% correspond respectively to 2.24 mm, 1.91 mm, 1.80 mm, 1.58 mm, 1.13 mm, and 0.68 mm. In the third embodiment, the image height 2.25 mm, when converted into the angle made with the optical axis by the chief ray prior to incidence on the lens system, is equivalent to 35.0°. The vertical axis of the aberration curves of FIG. 13 indicates the distance of incidence h (F number), the maximum of which corresponds to F2.8. In FIG. 13, the horizontal axis indicates the magnitude of the aberration.

The absolute value of the amount of distortion aberration is maximum, at 2.65%, at the position of 100% image height (image height 2.24 mm); at image heights equal to or below 2.24 mm, the absolute value of the aberration amount is within 2.65%.

The absolute value of the astigmatic aberration in the meridional plane is maximum, at 0.066 mm, at the position of 100% image height (image height 2.24 mm), and the absolute value of the aberration is within 0.066 mm at image heights of 2.24 mm and less.

The absolute value of chromatic/spherical aberration is maximum, at 0.102 mm, for the g line at a distance of incidence h of 70%, and the absolute value of the aberration is within 0.102 mm.

Fourth Embodiment (A) The focal length f of the entire lens is f=3.073 mm.

(B) The object-side curvature radius r5 of the second lens L2 is r5=−1.838 mm.

(C) The image-side curvature radius r6 of the second lens L2 is r6=−1.073 mm.

(D) The back focus bf is bf=1.675 mm.

(E) The distance in air from the object-side surface of the first lens L1 to the image plane, that is, the optical length d, is d=3.864 mm.

(F) The object-side curvature radius r1 of the first lens L1 is r1=0.981 mm.

(G) The image-side curvature radius r2 of the first lens L1 is r2=1.084 mm.

(H) The interval D2 between the first lens L1 and the second lens L2 is D2=0.279 mm.

(I) The focal length f1 of the first lens L1 is f1=4.46 mm.

(J) The focal length f2 of the second lens L2 is f2=3.51 mm.

Hence the following obtain:

(1) |r5/f|=|−1.838/3.0731=0.598, (2) (r5+r6)/(r5−r6)=(1.838+1.073)/(1.838−1.073)=3.805, (3) d/f=3.864/3.073=1.2574, (4) r1/r2=0.981/1.084=0.905, and (5) D2/f=0.279/3.073=0.0908.

Hence the lens system of the fourth embodiment satisfies all of the following condition equations (1) through (5).

$$0.2<|r5/f|<3.1 \quad (1)$$

$$3.0<(r5+r6)/(r5-r6)<19.0 \quad (2)$$

$$1.0<d/f<1.5 \quad (3)$$

$$0.5<r1/r2<2.0 \quad (4)$$

$$0.08<D2/f<0.1 \quad (5)$$

The aperture diaphragm S1 is provided at a position 0.14 mm (d2=0.14 mm) anterior from the second surface (the image-side surface) of the first lens L1, as indicated in Table 4. The numerical aperture (F number) is 2.8, and the combined focal length f is 3.073 mm.

Figure 14:
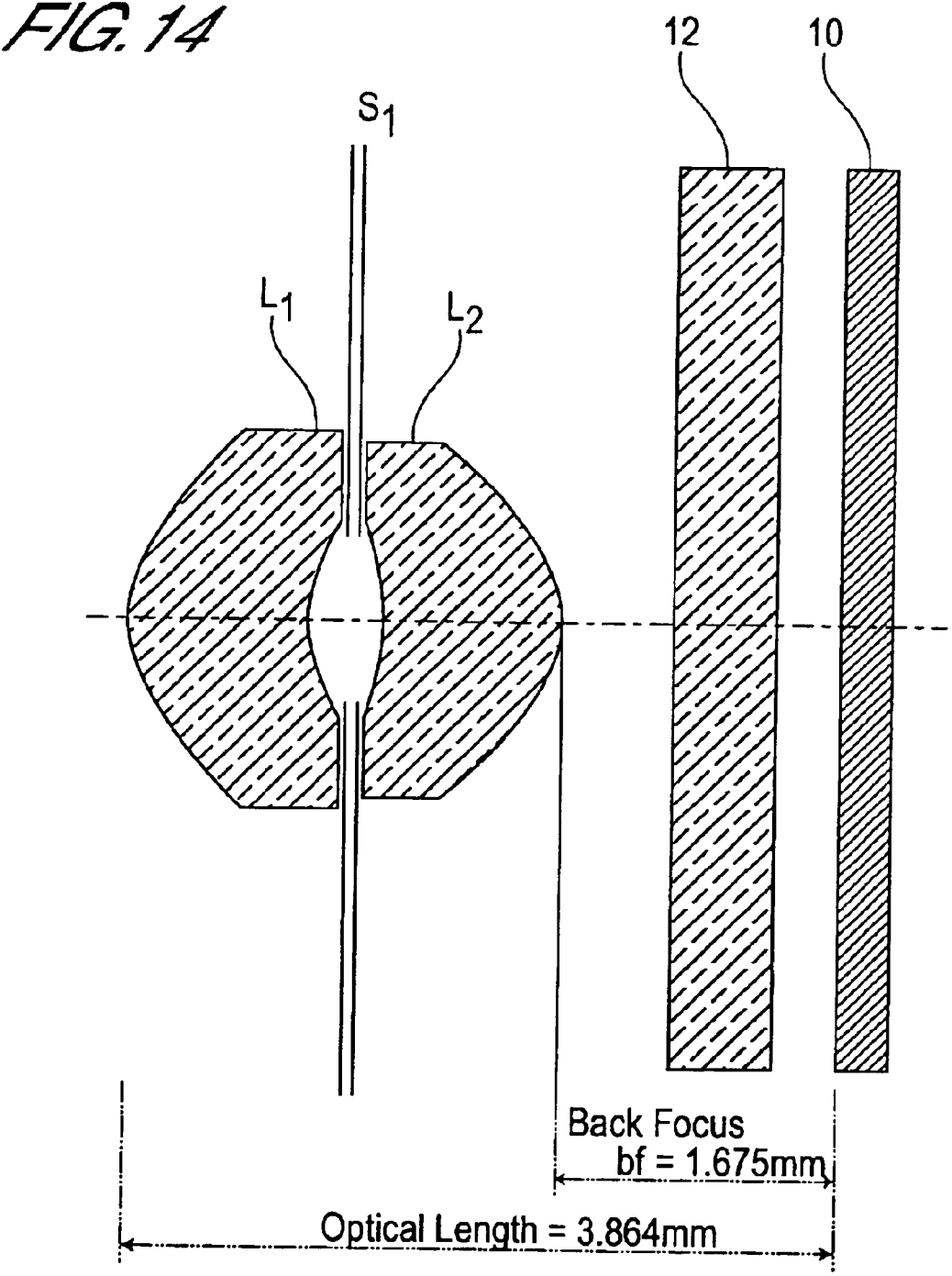
FIG. 14 is a cross-sectional view of a lens for image pickup of a fourth embodiment.

FIG. 14 shows a cross-sectional view of the lens for image pickup of the fourth embodiment. The optical length of this lens for image pickup is 3.864 mm, a value which is within the 6 mm limit. The back focus, at 1.675 mm, is also sufficiently long.

Figure 15:
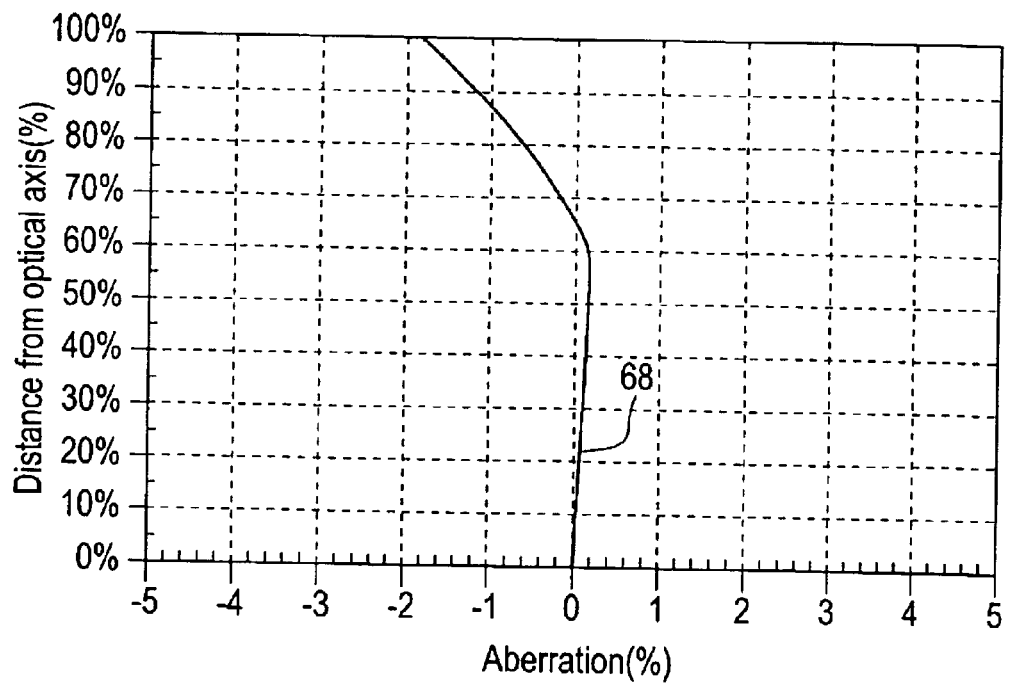
FIG. 15 is a graph of the distortion aberration of the lens for image pickup of the fourth embodiment.
Figure 16:
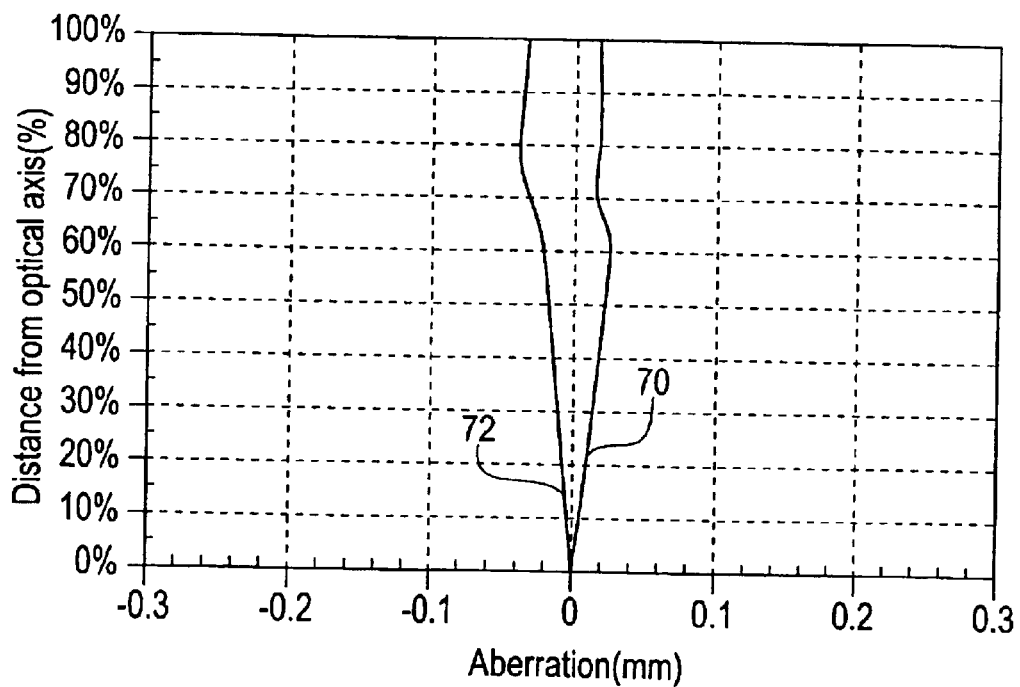
FIG. 16 is a graph of the astigmatic aberration of the lens for image pickup of the fourth embodiment.
Figure 17:
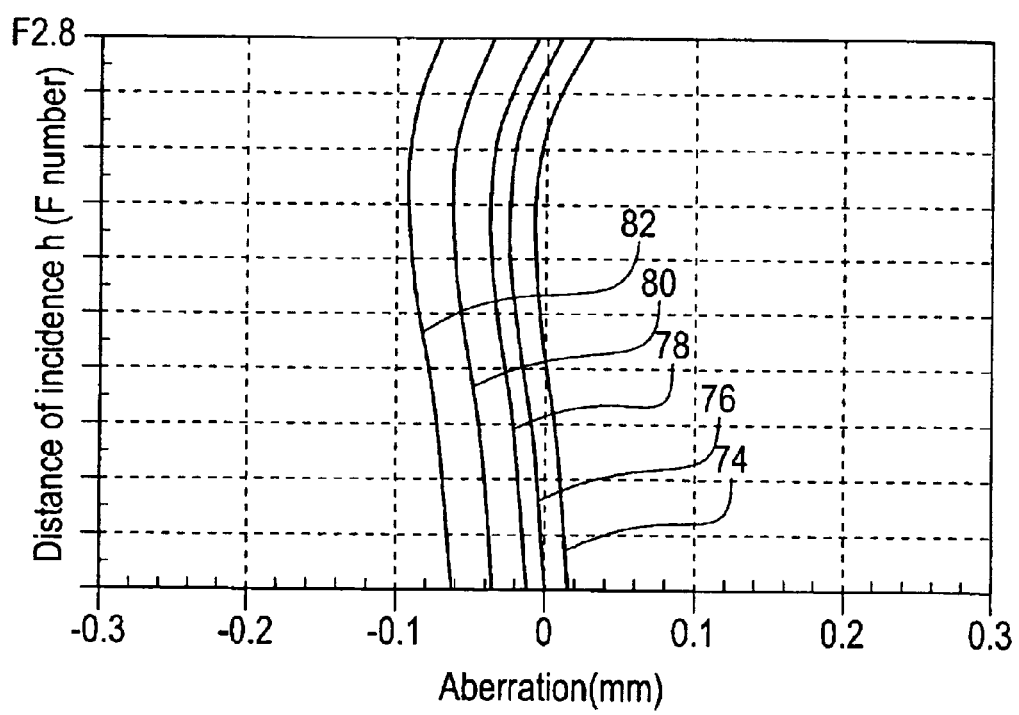
FIG. 17 is a graph of the chromatic/spherical aberration of the lens for image pickup of the fourth embodiment.

The distortion aberration curve 68 shown in FIG. 15, the astigmatic aberration curves (aberration curve 70 for the meridional plane and aberration curve 72 for the sagittal plane) shown in FIG. 16, and the chromatic/spherical aberration curves (aberration curve 74 for the C line, aberration curve 76 for the d line, aberration curve 78 for the e line, aberration curve 80 for the F line, and aberration curve 82 for the g line) shown in FIG. 17, are each shown in graphs.

The vertical axes for the aberration curves in FIG. 15 and FIG. 16 indicate the image height as a percentage of the distance from the optical axis; 100%, 85%, 80%, 70%, 50%, and 30% correspond respectively to 1.80 mm, 1.53 mm, 1.44 mm, 1.26 mm, 0.90 mm, and 0.54 mm. In the fourth embodiment, the image height 1.80 mm, when converted into the angle made with the optical axis by the chief ray prior to incidence on the lens system, is equivalent to 31.0°. The vertical axis of the aberration curves of FIG. 17 indicates the distance of incidence h (F number), the maximum of which corresponds to F2.8. In FIG. 17, the horizontal axis indicates the magnitude of the aberration.

The absolute value of the amount of distortion aberration is maximum, at 1.83%, at the position of 100% image height (image height 1.80 mm); at image heights equal to or below 1.80 mm, the absolute value of the aberration amount is within 1.83%.

The absolute value of the astigmatic aberration in the meridional plane is maximum, at 0.039 mm, at the position of 80% image height (image height 1.44 mm), and the absolute value of the aberration is within 0.039 mm at image heights of 1.80 mm and less.

The absolute value of chromatic/spherical aberration is maximum, at 0.0924 mm, for the g line at a distance of incidence h of 70%, and the absolute value of the aberration is within 0.0924 mm.

Fifth Embodiment (A) The focal length f of the entire lens is f=3.797 mm.

(B) The object-side curvature radius r5 of the second lens L2 is r5=−1.4365 mm.

(C) The image-side curvature radius r6 of the second lens L2 is r6=−1.0050 mm.

(D) The back focus bf is bf=2.678 mm.

(E) The distance in air from the object-side surface of the first lens L1 to the image plane, that is, the optical length d, is d=5.028 mm.

(F) The object-side curvature radius r1 of the first lens L1 is r1=1.1547 mm.

(G) The image-side curvature radius r2 of the first lens L1 is r2=1.0521 mm.

(H) The interval D2 between the first lens L1 and the second lens L2 is D2=0.350 mm.

(I) The focal length f1 of the first lens L1 is f1=7.84 mm.

(J) The focal length f2 of the second lens L2 is f2=3.55 mm.

Hence the following obtain:

(1) |r5/f|=|−1.4365/3.7971=0.3783, (2) (r5+r6)/(r5−r6)=(1.4365+1.0050)/(1.4365−1.0050)= 5.6582, (3) d/f=5.028/3.797=1.3242, (4) r1/r2=1.1574/1.0521=1.1001, and (5) D2/f=0.350/3.797=0.0922.

Hence the lens system of the fifth embodiment satisfies all of the following condition equations (1) through (5).

$$0.2<|r5/f|<3.1 \quad (1)$$

$$3.0<(r5+r6)/(r5-r6)<19.0 \quad (2)$$

$$1.0<d/f<1.5 \quad (3)$$

$$0.5<r1/r2<2.0 \quad (4)$$

$$0.08<D2/f<0.1 \quad (5)$$

The aperture diaphragm S1 is provided at a position 0.18 mm (d2=0.18 mm) anterior from the second surface (the image-side surface) of the first lens L1, as indicated in Table 5. The numerical aperture (F number) is 2.8, and the combined focal length f is 3.797 mm.

Figure 18:
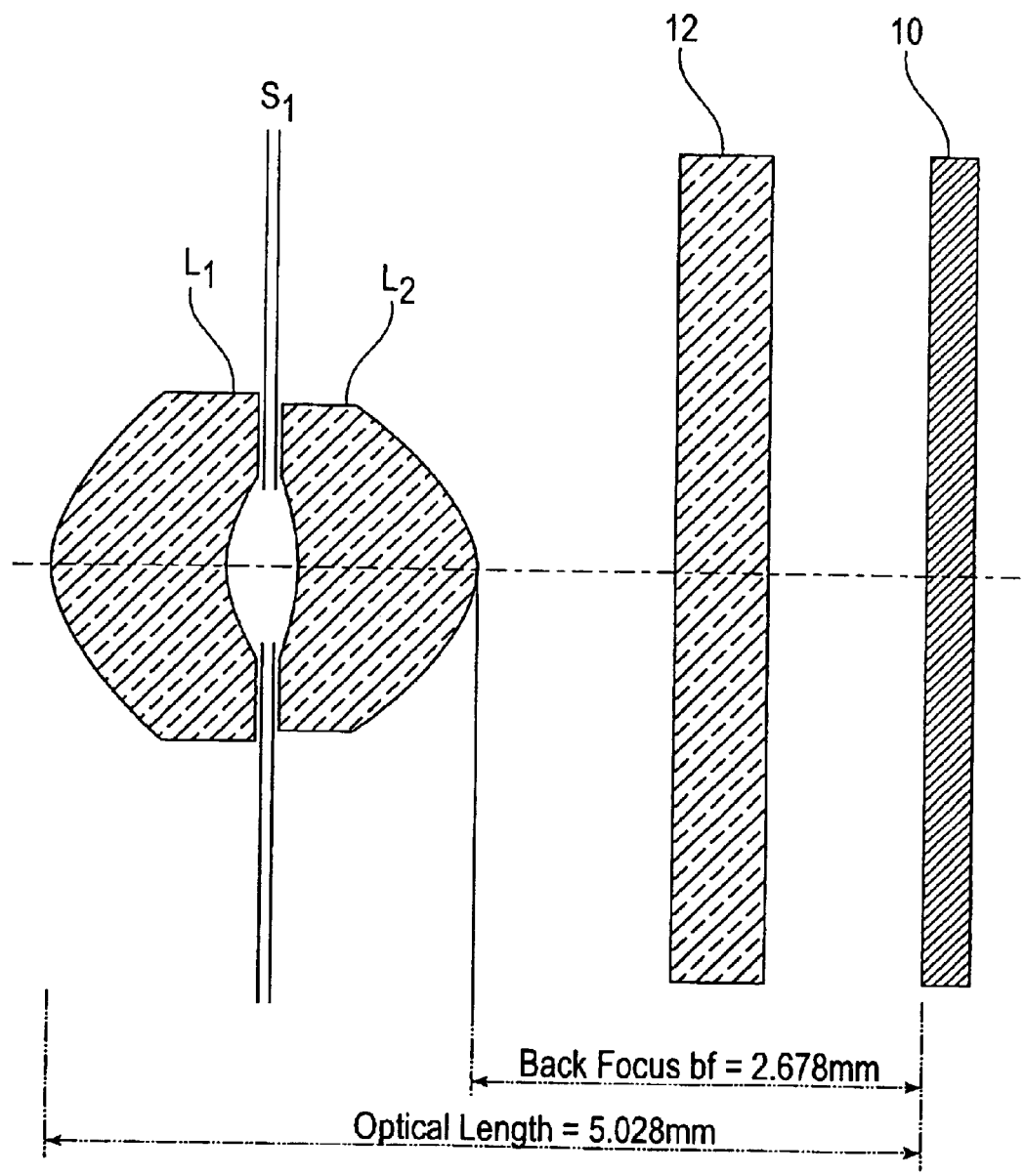
FIG. 18 is a cross-sectional view of a lens for image pickup of a fifth embodiment.

FIG. 18 shows a cross-sectional view of the lens for image pickup of the fifth embodiment. The optical length of this lens for image pickup is 5.028 mm, a value which is within the 6 mm limit. The back focus, at 2.678 mm, is also sufficiently long.

Figure 19:
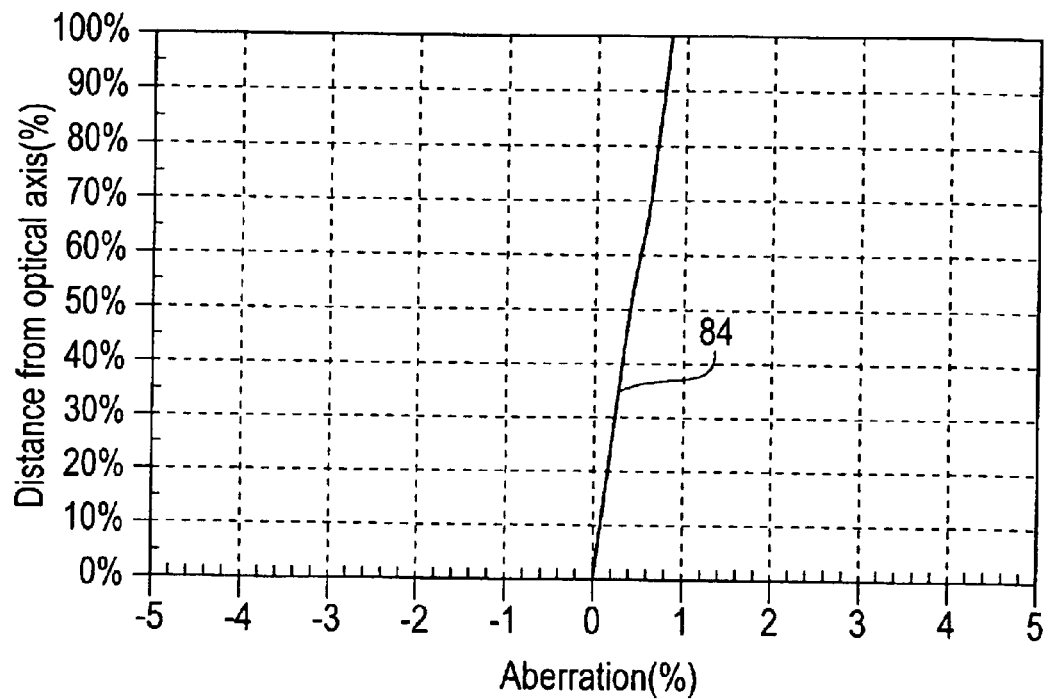
FIG. 19 is a graph of the distortion aberration of the lens for image pickup of the fifth embodiment.
Figure 20:
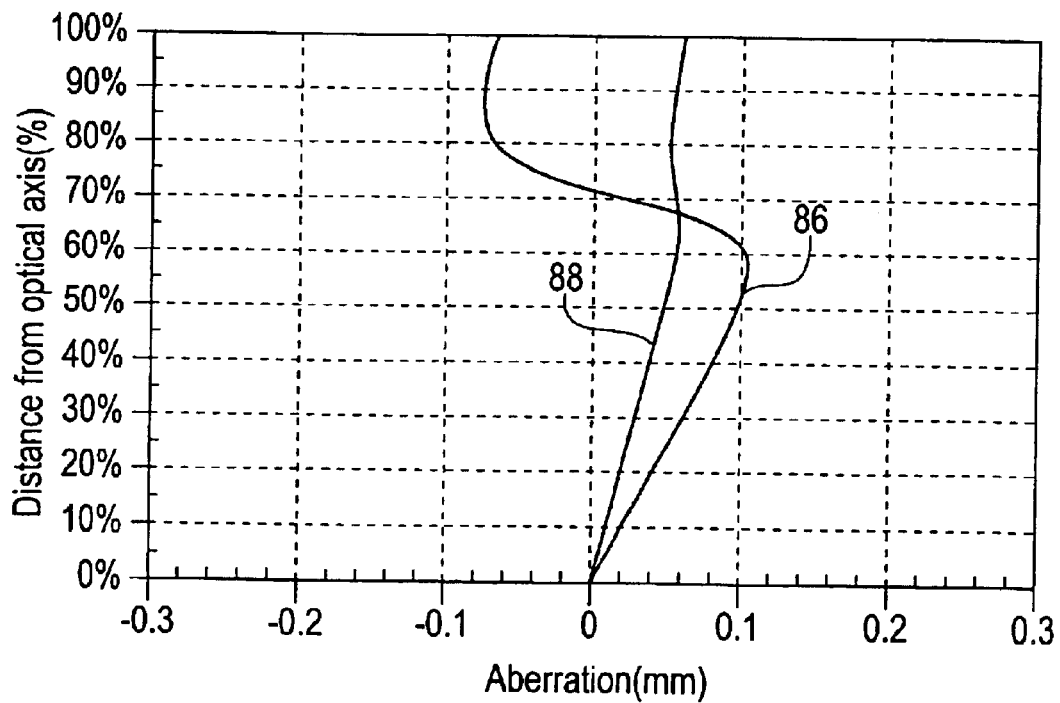
FIG. 20 is a graph of the astigmatic aberration of the lens for image pickup of the fifth embodiment.
Figure 21:
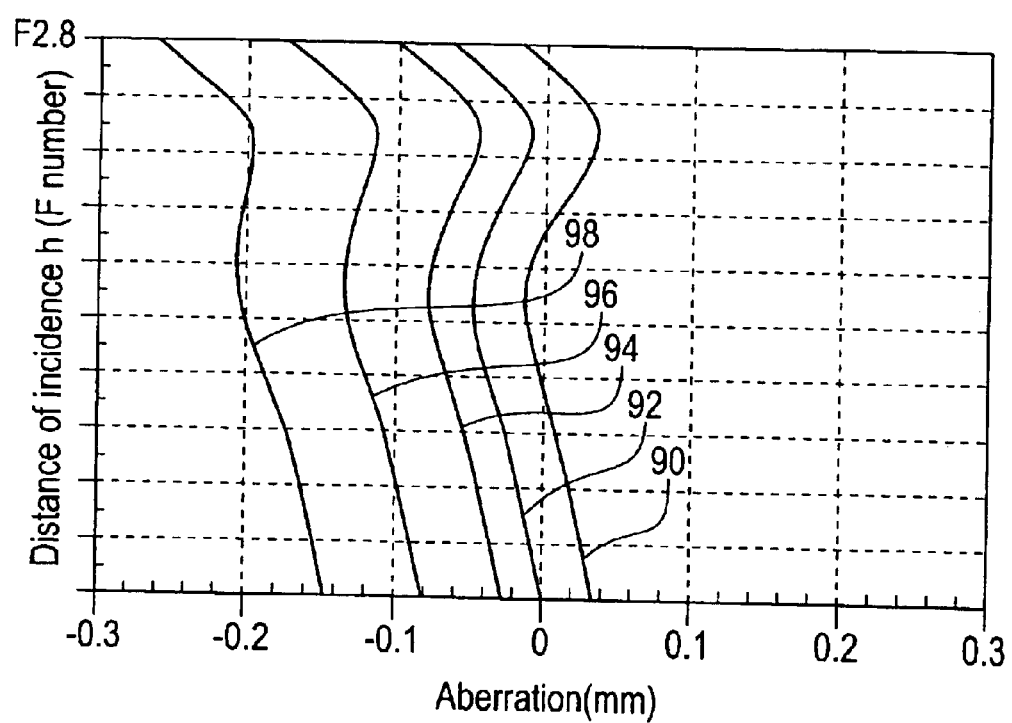
FIG. 21 is a graph of the chromatic/spherical aberration of the lens for image pickup of the fifth embodiment.

The distortion aberration curve 84 shown in FIG. 19, the astigmatic aberration curves (aberration curve 86 for the meridional plane and aberration curve 88 for the sagittal plane) shown in FIG. 20, and the chromatic/spherical aberration curves (aberration curve 90 for the C line, aberration curve 92 for the d line, aberration curve 94 for the e line, aberration curve 96 for the F line, and aberration curve 98 for the g line) shown in FIG. 21, are each shown in graphs.

The vertical axes for the aberration curves in FIG. 19 and FIG. 20 indicate the image height as a percentage of the distance from the optical axis; 100%, 85%, 80%, 70%, 50%, and 30% correspond respectively to 2.24 mm, 1.90 mm, 1.79 mm, 1.57 mm, 1.12 mm, and 0.67 mm. In the fifth embodiment, the image height 2.24 mm, when converted into the angle made with the optical axis by the chief ray prior to incidence on the lens system, is equivalent to 30.3°. The vertical axis of the aberration curves of FIG. 21 indicates the distance of incidence h (F number), the maximum of which corresponds to F2.8. In FIG. 21, the horizontal axis indicates the magnitude of the aberration.

The absolute value of the amount of distortion aberration is maximum, at 0.83%, at the position of 100% image height (image height 2.24 mm); at image heights equal to or below 2.24 mm, the absolute value of the aberration amount is within 0.83%.

The absolute value of the astigmatic aberration in the meridional plane is maximum, at 0.103 mm, at the position of 60% image height (image height 1.34 mm), and the absolute value of the aberration is within 0.103 mm at image heights of 2.24 mm and less.

The absolute value of chromatic/spherical aberration is maximum, at 0.2608 mm, for the g line at a distance of incidence h of 100%, and the absolute value of the aberration is within 0.2608 mm.

Sixth Embodiment (A) The focal length f of the entire lens is f=3.799 mm.

(B) The object-side curvature radius r5 of the second lens L2 is r5=−1.7322 mm.

(C) The image-side curvature radius r6 of the second lens L2 is r6=−1.5507 mm.

(D) The back focus bf is bf=1.835 mm.

(E) The distance in air from the object-side surface of the first lens L1 to the image plane, that is, the optical length d, is d=4.235 mm.

(F) The object-side curvature radius r1 of the first lens L1 is r1=1.005 mm.

(G) The image-side curvature radius r2 of the first lens L1 is r2=1.250 mm.

(H) The interval D2 between the first lens L1 and the second lens L2 is D2=0.350 mm.

(I) The focal length f1 of the first lens L1 is f1=3.84 mm.

(J) The focal length f2 of the second lens L2 is f2=8.67 mm.

Hence the following obtain:

(1) $|r5/f|=|-1.7322/3.7991|=0.456$, (2) $(r5+r6)/(r5-r6)=(1.7322+1.5507)/(1.7322-1.5507)=18.09$, (3) $d/f=4.235/3.799=1.1148$, (4) $r1/r2=1.005/1.250=0.804$, and (5) $D2/f=0.350/3.799=0.0921$.

Hence the lens system of the sixth embodiment satisfies all of the following condition equations (1) through (5).

$$0.2<|r5/f|<3.1 \quad (1)$$

$$3.0<(r5+r6)/(r5-r6)<19.0 \quad (2)$$

$$1.0<d/f<1.5 \quad (3)$$

$$0.5<r1/r2<2.0 \quad (4)$$

$$0.08<D2/f<0.1 \quad (5)$$

The aperture diaphragm S1 is provided at a position 0.15 mm (d2=0.15 mm) anterior from the second surface (the image-side surface) of the first lens L1, as indicated in Table 6. The numerical aperture (F number) is 2.8, and the combined focal length f is 3.799 mm.

Figure 22:
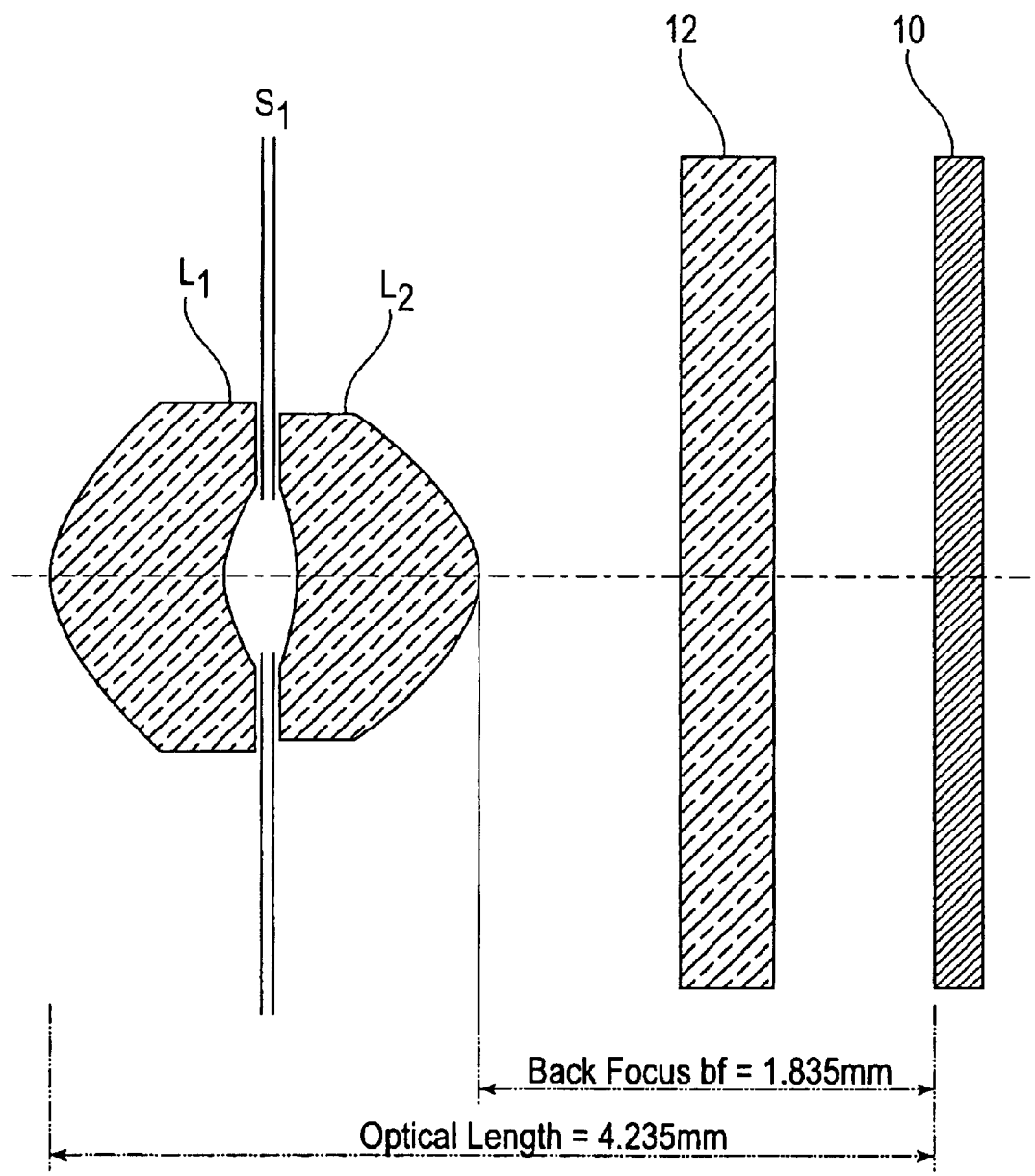
FIG. 22 is a cross-sectional view of a lens for image pickup of a sixth embodiment.

FIG. 22 shows a cross-sectional view of the lens for image pickup of the sixth embodiment. The optical length of this lens for image pickup is 4.235 mm, a value which is within the 6 mm limit. The back focus, at 1.835 mm, is also sufficiently long.

Figure 23:
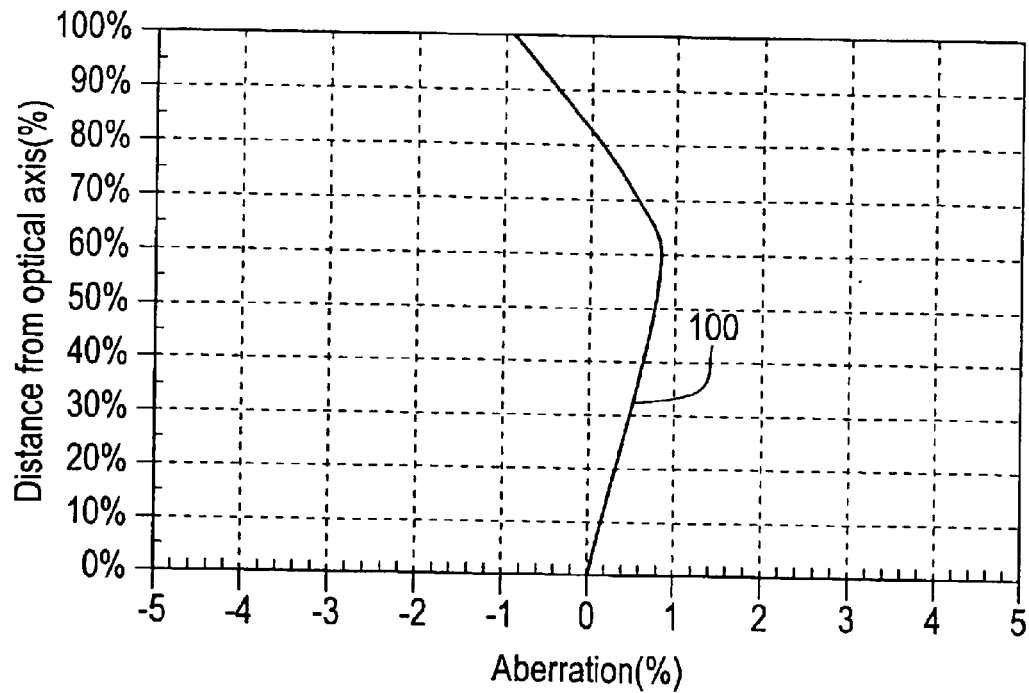
FIG. 23 is a graph of the distortion aberration of the lens for image pickup of the sixth embodiment.
Figure 24:
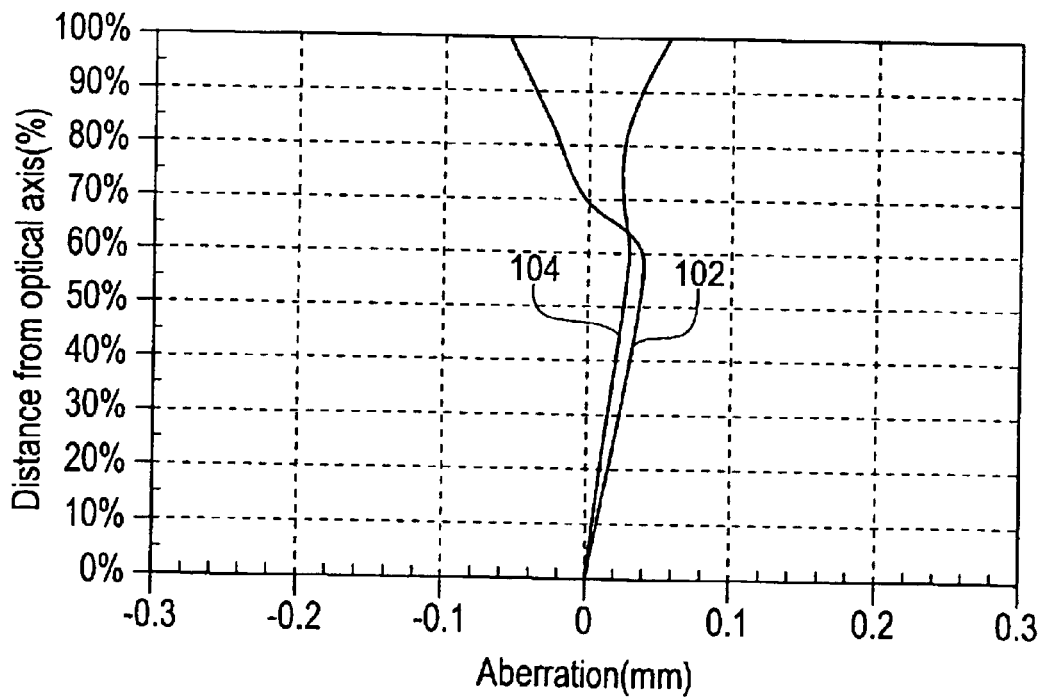
FIG. 24 is a graph of the astigmatic aberration of the lens for image pickup of the sixth embodiment.
Figure 25:
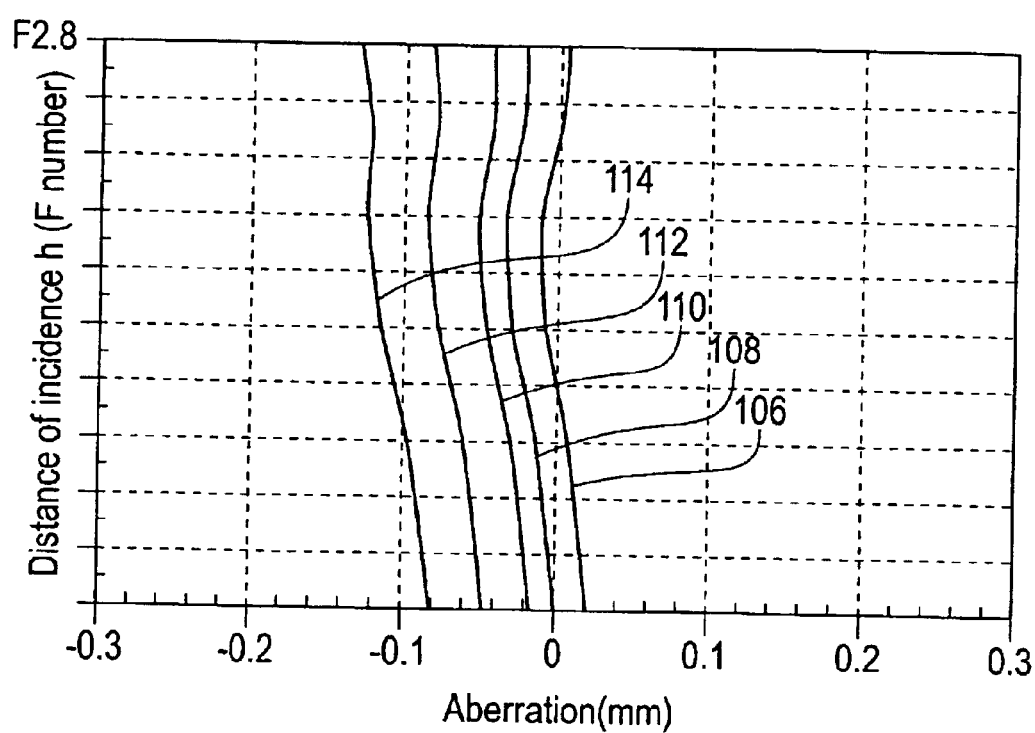
FIG. 25 is a graph of the chromatic/spherical aberration of the lens for image pickup of the sixth embodiment.

The distortion aberration curve 100 shown in FIG. 23, the astigmatic aberration curves (aberration curve 102 for the meridional plane and aberration curve 104 for the sagittal plane) shown in FIG. 24, and the chromatic/spherical aberration curves (aberration curve 106 for the C line, aberration curve 108 for the d line, aberration curve 110 for the e line, aberration curve 112 for the F line, and aberration curve 114 for the g line) shown in FIG. 25, are each shown in graphs.

The vertical axes for the aberration curves in FIG. 23 and FIG. 24 indicate the image height as a percentage of the distance from the optical axis; 100%, 85%, 80%, 70%, 50%, and 30% correspond respectively to 2.24 mm, 1.90 mm, 1.79 mm, 1.57 mm, 1.12 mm, and 0.67 mm. In the sixth embodiment, the image height 2.24 mm, when converted into the angle made with the optical axis by the chief ray prior to incidence on the lens system, is equivalent to 30.8°. The vertical axis of the aberration curves of FIG. 25 indicates the distance of incidence h (F number), the maximum of which corresponds to F2.8. The horizontal axis indicates the magnitude of the aberration.

The absolute value of the amount of distortion aberration is maximum, at 0.91%, at the position of 100% image height (image height 2.24 mm); at image heights equal to or below 2.24 mm, the absolute value of the aberration amount is within 0.91%.

The absolute value of the astigmatic aberration in the sagittal plane is maximum, at 0.056 mm, at the position of 100% image height (image height 2.24 mm), and the absolute value of the aberration is within 0.056 mm at image heights of 2.24 mm and less.

The absolute value of chromatic/spherical aberration is maximum, at 0.129 mm, for the g line at a distance of incidence h of 100%, and the absolute value of the aberration is within 0.129 mm.

Seventh Embodiment (A) The focal length f of the entire lens is f=3.792 mm.

(B) The object-side curvature radius r5 of the second lens L2 is r5=−1.9498 mm.

(C) The image-side curvature radius r6 of the second lens L2 is r6=−1.6027 mm.

(D) The back focus bf is bf=1.844 mm.

(E) The distance in air from the object-side surface of the first lens L1 to the image plane, that is, the optical length d, is d=4.244 mm.

(F) The object-side curvature radius r1 of the first lens L1 is r1=1.0807 mm.

(G) The image-side curvature radius r2 of the first lens L1 is r2=1.2496 mm.

(H) The interval D2 between the first lens L1 and the second lens L2 is D2=0.350 mm.

(I) The focal length f1 of the first lens L1 is f1=4.04 mm.

(J) The focal length f2 of the second lens L2 is f2=7.69 mm.

Hence the following obtain:

(1) $|r5/f|=|-1.9498/3.7921|=0.5142$, (2) $(r5+r6)/(r5-r6)=(1.9498+1.6027)/(1.9498-1.6027)=10.2348$, (3) $d/f=4.244/3.792=1.1192$, (4) $r1/r2=1.0807/1.2496=0.8648$, and (5) $D2/f=0.350/3.792=0.0923$.

Hence the lens system of the seventh embodiment satisfies all of the following condition equations (1) through (5).

$$0.2 < |r5/f| < 3.1 \quad (1)$$

$$3.0 < (r5+r6)/(r5-r6) < 19.0 \quad (2)$$

$$1.0 < d/f < 1.5 \quad (3)$$

$$0.5 < r1/r2 < 2.0 \quad (4)$$

$$0.08 < D2/f < 0.1 \quad (5)$$

The aperture diaphragm S1 is provided at a position 0.15 mm (d2=0.15 mm) anterior from the second surface (the image-side surface) of the first lens L1, as indicated in Table 7. The numerical aperture (F number) is 2.8, and the combined focal length f is 3.792 mm.

Figure 26:
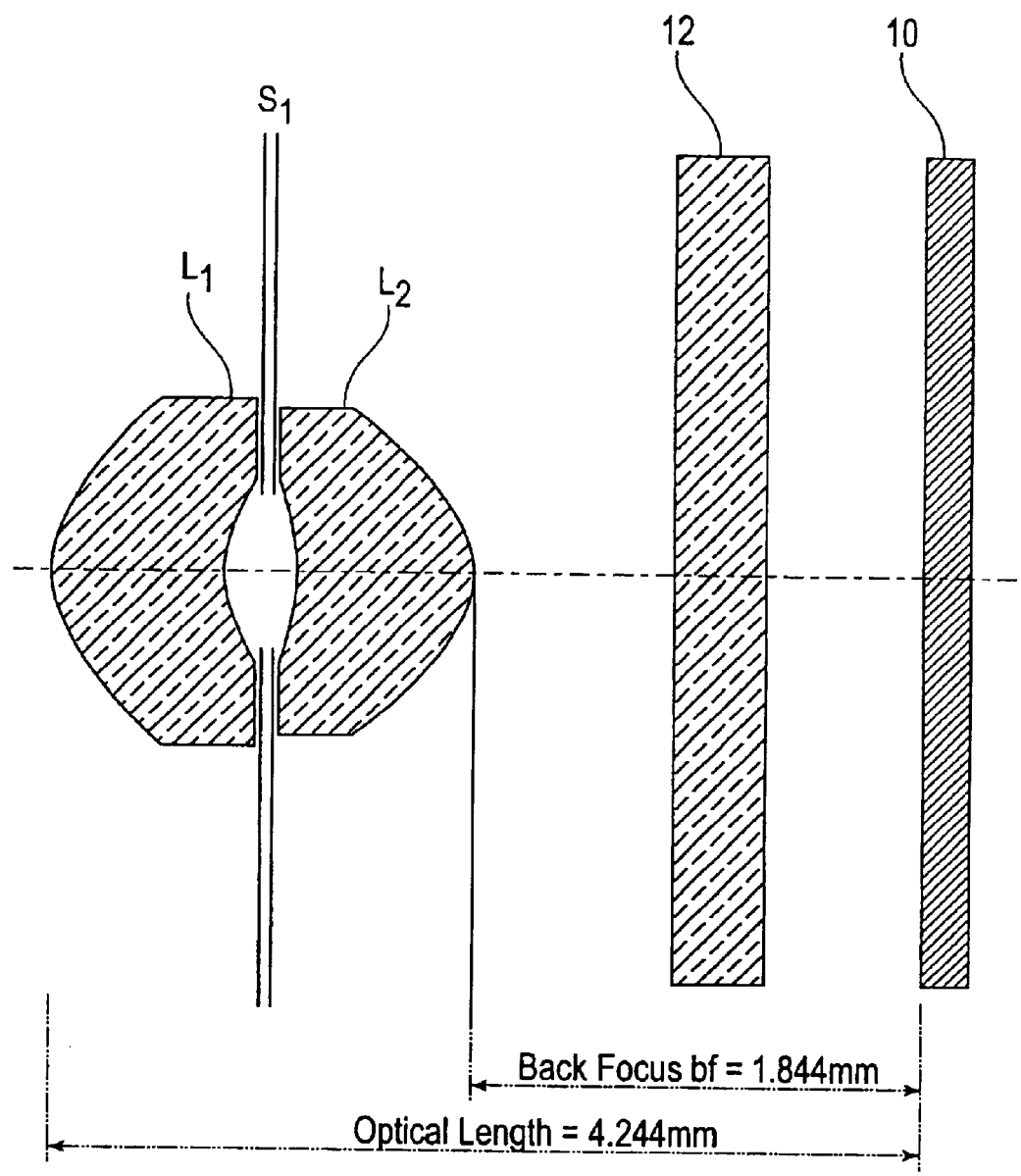
FIG. 26 is a cross-sectional view of a lens for image pickup of a seventh embodiment.

FIG. 26 shows a cross-sectional view of the lens for image pickup of the seventh embodiment. The optical length of this lens for image pickup is 4.244 mm, a value which is within the 6 mm limit. The back focus, at 1.844 mm, is also sufficiently long.

Figure 27:
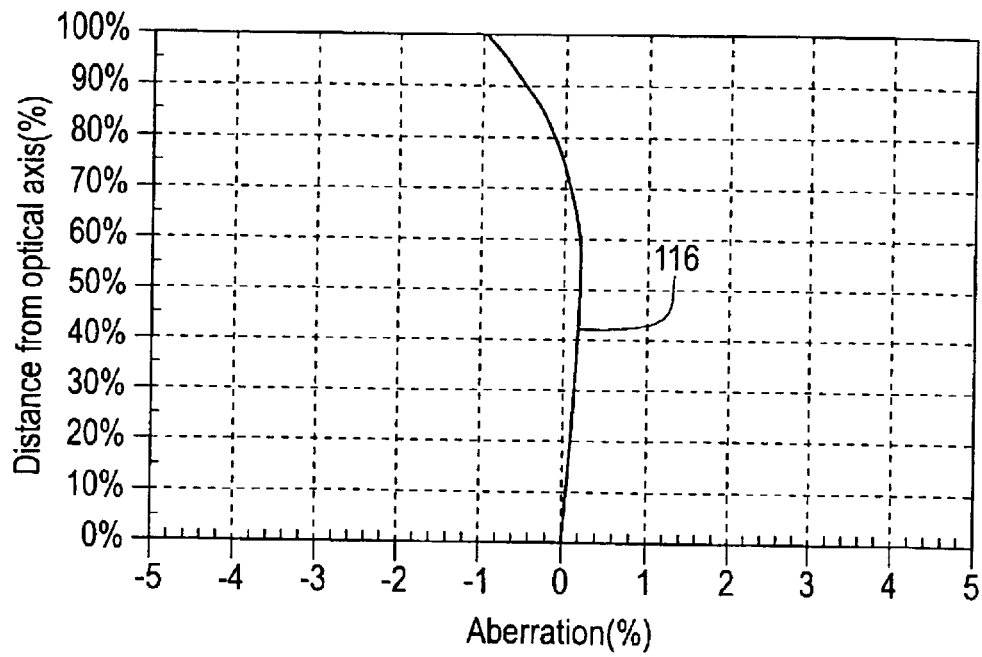
FIG. 27 is a graph of the distortion aberration of the lens for image pickup of the seventh embodiment.
Figure 28:
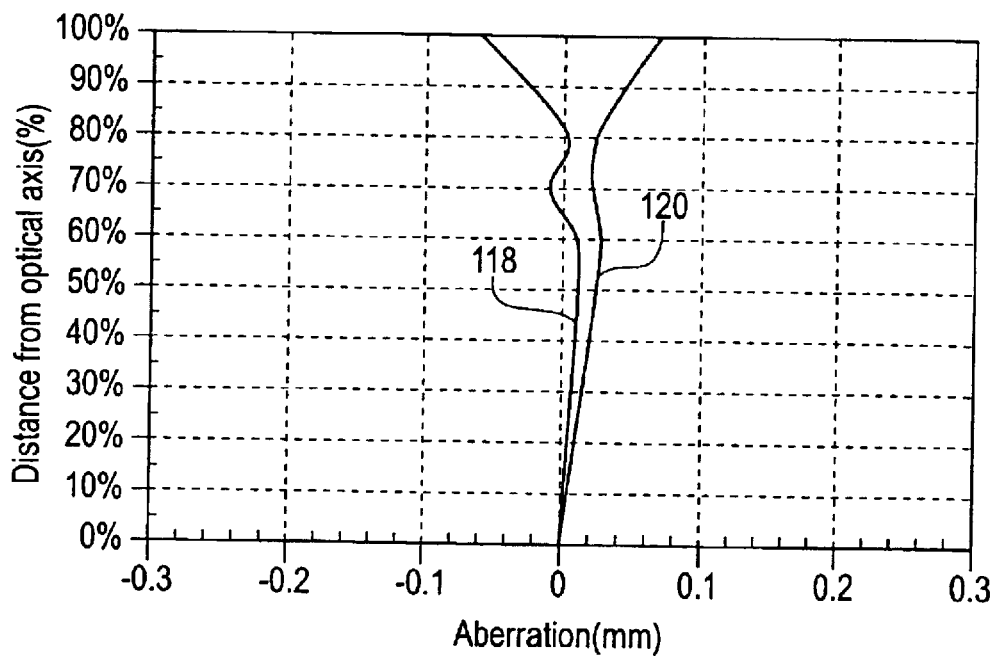
FIG. 28 is a graph of the astigmatic aberration of the lens for image pickup of the seventh embodiment; and, FIG. 29 is a graph of the chromatic/spherical aberration of the lens for image pickup of the seventh embodiment.
Figure 29:
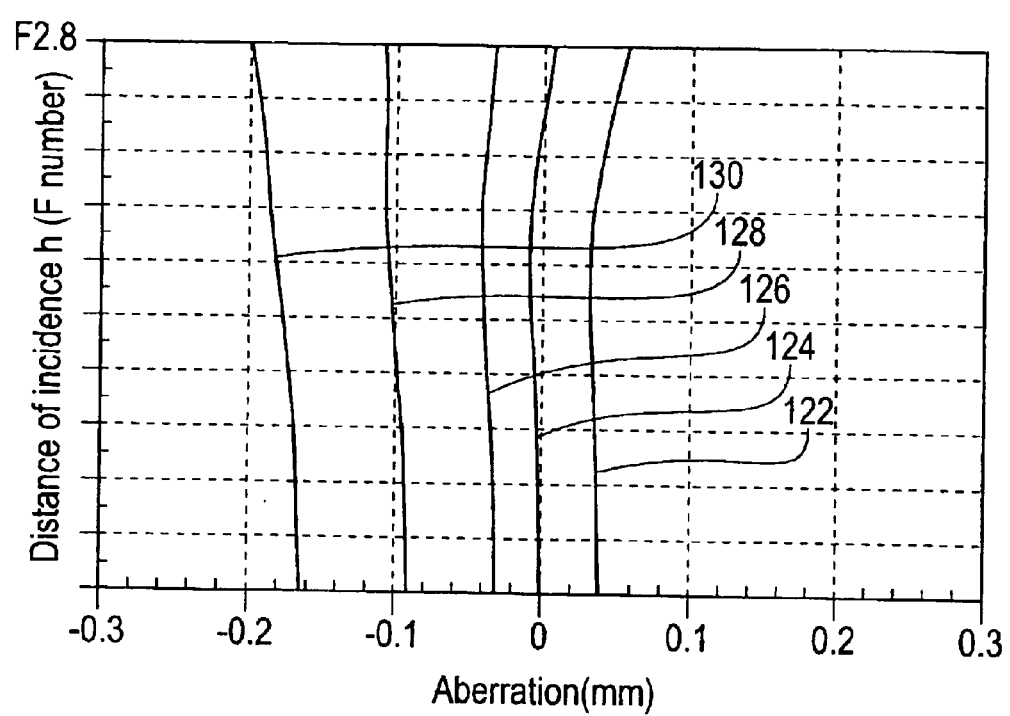

The distortion aberration curve 116 shown in FIG. 27, the astigmatic aberration curves (aberration curve 118 for the meridional plane and aberration curve 120 for the sagittal plane) shown in FIG. 28, and the chromatic/spherical aberration curves (aberration curve 122 for the C line, aberration curve 124 for the d line, aberration curve 126 for the e line, aberration curve 128 for the F line, and aberration curve 130 for the g line) shown in FIG. 29, are each shown in graphs.

The vertical axes for the aberration curves in FIG. 27 and FIG. 28 indicate the image height as a percentage of the distance from the optical axis; 100%, 85%, 80%, 70%, 50%, and 30% correspond respectively to 2.24 mm, 1.90 mm, 1.79 mm, 1.57 mm, 1.12 mm, and 0.67 mm. In the seventh embodiment, the image height 2.24 mm, when converted into the angle made with the optical axis by the chief ray prior to incidence on the lens system, is equivalent to 30.8°. The vertical axis of the aberration curves of FIG. 29 indicates the distance of incidence h (F number), the maximum of which corresponds to F2.8. The horizontal axis indicates the magnitude of the aberration.

The absolute value of the amount of distortion aberration is maximum, at 0.96%, at the position of 100% image height (image height 2.24 mm); at image heights equal to or below 2.24 mm, the absolute value of the aberration amount is within 0.96%.

The absolute value of the astigmatic aberration in the sagittal plane is maximum, at 0.0693 mm, at the position of 100% image height (image height 2.24 mm), and the absolute value of the aberration is within 0.0693 mm at image heights of 2.24 mm and less.

The absolute value of chromatic/spherical aberration is maximum, at 0.1993 mm, for the g line at a distance of incidence h of 100%, and the absolute value of the aberration is within 0.1993 mm.

It was found that the lenses for image pickup of all of the above embodiments provide the performance required of a lens for mounting in a compact camera which employs a CCD or CMOS device as the imaging device.

Thus as is clear from the above explanation of a lens for image pickup of this invention, by designing each of the component lenses of the lens for image pickup so as to satisfy the condition equations (1) through (5), the problems to be solved by this invention are solved. That is, a lens for image pickup is obtained in which the various aberrations are satisfactorily corrected, a sufficient back focus is obtained, and the optical length is kept short.

In the above-described embodiments, the plastic material ZEONEX E48R was used in the first and second lenses; but in addition to plastics other than that of the embodiments, any material which satisfies the various conditions explained in the embodiments, even if not a plastic material, such as glass or another material, can of course be used.

As explained above, in this invention a lens for image pickup is realized in which various aberrations are satisfactorily corrected, which has a maximum optical length of approximately 6 mm (5.028 mm in the case of the lens for image pickup of the fifth embodiment, with the longest optical length), and which is appropriate for use in compact CCD cameras suitable for mounting in a telephone or other equipment.

On the other hand, the optical length of an image pickup leans with a two-group, two-lens configuration, disclosed in Japanese Patent Laid-open No. 2001-174701, having a back focus of appropriate length, a broad angle of field and small distortion aberration, is 6.56 mm for the embodiment with the smallest optical length (the first embodiment in the above patent). In this embodiment, the distance from the object-side surface of the lens positioned on the object side to the object-side surface of the lens positioned on the image side is 2.9 mm (when the lens thicknesses, lens interval and similar are added, the result is 1.30 mm+0.30 mm+0.20 mm+1.10 mm=2.9 mm), and the back focus is 3.66 mm; hence the sum of these gives the optical length of 6.56 mm.

The optical length of an image pickup leans with a two-group, two-lens configuration, disclosed in Japanese Patent Laid-open No. 2000-321489, having a sufficiently long back focus, the refractive powers of the object-side lens-and image-side lens of which can be set appropriately, and manufacture of which is easy, is 11.179 mm in that embodiment among all the embodiments with the smallest optical length (embodiment 3 in the above patent) (when the lens thicknesses, lens interval and similar are added, the result is 1.15 mm+3.15 mm+1.25 mm+5.629 mm=11.179 mm).

The optical length of an image pickup leans with a two-group, two-lens configuration, disclosed in Japanese Patent Laid-open No. 2002-267928, which is compact and lightweight, having good telecentric properties and enabling easy correction of astigmatic aberration, and machining and assembly of which are easy, is 5.92 mm in that embodiment among all the embodiments with the smallest optical length (embodiment 5 in the above patent) (when the lens thicknesses, lens interval and similar are added, the result is 0.80 mm+0.30 mm+0.20 mm+0.10 mm+1.30 mm+3.22 mm=5.92 mm). However, the image pickup lens disclosed in the above patent, the optical length of which is 5.92 mm, has distortion aberration of approximately 5%, has spherical aberration for the g line the absolute value of which exceeds 0.2 mm, and has astigmatic aberration also exceeding 0.2 mm (see FIG. 10 of the above patent). These values of the distortion aberration, spherical aberration and astigmatic aberration are far larger than the aberration values of the lenses for image pickup described in the first through seventh embodiments of this invention.

In this way, all of the examples of the prior art either have an optical length exceeding 6 mm, or, even if the optical length does not reach 6 mm, have aberrations which cannot be adequately eliminated, and so are not suitable for mounting in recent portable telephone sets and similar.

On the other hand, by means of a lens for image pickup of this invention, satisfactory images can be obtained and an adequate back focus can be secured, in spite of a short optical length. That is, by means of a lens for image pickup of this invention, a back focus of sufficient length to insert cover glass of thickness approximately 0.5 mm is secured in each of the above-described embodiments. Specifically, a back focus of length 2.671 mm in the first embodiments, 1.831 mm in the second embodiment, 1.795 mm in the third embodiment, 1.675 mm in the fourth embodiment, 2.678 mm in the fifth embodiment, 1.835 mm in the sixth embodiment, and 1.844 mm in the seventh embodiment is secured, sufficient to insert cover glass of thickness approximately 0.5 mm.

Further, by means of a lens for image pickup of this invention, lenses formed from material with an Abbe number between 30 and 60 can be used, and consequently cycloolefin plastics or polycarbonate can be utilized as lens material. Because of this, expensive aspherical molded glass need not be used, and production at low cost is possible; moreover, the lens weight is reduced.

From the above explanation it is clear that a lens for image pickup of this invention can be employed not only as a camera lens in portable phone sets, personal computers or digital cameras, but also as a camera lens incorporated into PDAs (personal digital assistants), as a camera lens incorporated into toys comprising image recognition functions, and as a camera lens incorporated in equipment for monitoring, inspection, and crime prevention.

What is claimed is:

1. A lens for image pickup, having a first lens L1, aperture diaphragm S1 and second lens L2, configured with the first lens L1, aperture diaphragm S1 and second lens L2 positioned in order from the object side toward the image side; and wherein the first lens L1 is a resin lens having a meniscus shape with the convex surface facing the object side, and having positive refractive power;

the second lens L2 is a resin lens having a meniscus shape with the convex surface facing the image side, and having positive refractive power; and, the distance in air from the object-side incident surface of said first lens to the image plane is, at maximum, 6 millimeters.

2. The lens for image pickup according to claim 1, wherein both surfaces of said first lens L1 are aspherical, and both surfaces of said second lens L2 are aspherical.

3. The lens for image pickup according to claim 1, wherein the following conditions are satisfied:

$$0.2 < |r5/f| < 3.1 \tag{1}$$

$$3.0 < (r5+r6)/(r5-r6) < 19.0 \tag{2}$$

$$1.0 < d/f < 1.5 \tag{3}$$

$$0.5 < r1/r2 < 2.0 \tag{4}$$

$$0.08 < D2/f < 0.1 \tag{5}$$

where f is the focal length of the entire lens system; r5 is the curvature radius near the optical axis of the object-side surface of the second lens L2 (axial curvature radius); r6 is the curvature radius near the optical axis of the image-side surface of the second lens L2 (axial curvature radius); d is the distance (in air) from the object-side surface of the first lens L1 to the image plane; r1 is the curvature radius near the optical axis of the object-side surface of the first lens L1 (axial curvature radius); r2 is the curvature radius near the optical axis of the image-side surface of the first lens L1 (axial curvature radius); and D2 is the interval between the first lens L1 and the second lens L2.

4. The lens for image pickup according to claim 1, wherein said first lens L1 and said second lens L2 constituting the lens for image pickup are formed from material having an Abbe number between 30 and 60.

5. The lens for image pickup according to claim 1, wherein said first lens L1 and said second lens L2 constituting the lens for image pickup are formed from a cycloolefin plastic or from polycarbonate.

6. The lens for image pickup according to claim 1, wherein aberration is corrected such that the magnitude of distortion aberration for an image height of 2.25 mm or less is within 3.00%.

* * * * *